(12) United States Patent
Ozaki et al.

(10) Patent No.: US 7,723,883 B2
(45) Date of Patent: May 25, 2010

(54) MOTOR BUILT-IN MAGNETIC BEARING DEVICE

(75) Inventors: Takayoshi Ozaki, Iwata (JP); Koichi Okada, Iwata (JP); Hiroyuki Yamada, Iwata (JP); Kenichi Suzuki, Iwata (JP)

(73) Assignee: NTN Corporation, Osaka (JP)

(*) Notice: Subject to any disclaimer, the term of this patent is extended or adjusted under 35 U.S.C. 154(b) by 153 days.

(21) Appl. No.: 12/095,933

(22) PCT Filed: Nov. 13, 2006

(86) PCT No.: PCT/JP2006/322560

§ 371 (c)(1),
(2), (4) Date: Jun. 3, 2008

(87) PCT Pub. No.: WO2007/066474

PCT Pub. Date: Jun. 14, 2007

(65) Prior Publication Data

US 2009/0127956 A1   May 21, 2009

(30) Foreign Application Priority Data

| Dec. 9, 2005 | (JP) | ............................ 2005-356031 |
| Dec. 9, 2005 | (JP) | ............................ 2005-356032 |
| Dec. 9, 2005 | (JP) | ............................ 2005-356034 |
| Dec. 9, 2005 | (JP) | ............................ 2005-356035 |
| Dec. 9, 2005 | (JP) | ............................ 2005-356036 |
| Dec. 9, 2005 | (JP) | ............................ 2005-356037 |

(51) Int. Cl.
*H02K 7/09* (2006.01)

(52) U.S. Cl. ..................................... 310/90.5

(58) Field of Classification Search ............... 310/90.5, 310/90
See application file for complete search history.

(56) References Cited

U.S. PATENT DOCUMENTS 5,783,887 A * 7/1998 Ueyama et al. ............ 310/90.5

(Continued)

FOREIGN PATENT DOCUMENTS

GB      2 298 901 A      9/1996

(Continued)

OTHER PUBLICATIONS

Patent Abstracts of Japan, Publication No. 08-261237 dated Oct. 8, 1996, 1 page.

(Continued)

*Primary Examiner*—Nguyen N Hanh
(74) *Attorney, Agent, or Firm*—Osha • Liang LLP

(57) ABSTRACT

The device includes a rolling bearing unit supporting a radial load and a magnetic bearing unit supporting an axial load and/or a bearing preload; an electromagnet fitted to a spindle housing so as to confront, on a non-contact basis, a flange shaped thrust plate mounted on a main shaft; a motor rotor of a motor for driving the shaft, and a motor stator opposed to the rotor, the shaft being driven by magnetic or Lorentz forces developed between the rotor and the stator; and a sensor detecting an axial force acting on the bearing unit, and a controller controlling the electromagnet. In this device, the stiffness of a composite spring formed by the bearing unit and a support system for the bearing unit is chosen to be higher than the negative stiffness of a composite spring of a motor part comprised of the electromagnet and the motor.

9 Claims, 12 Drawing Sheets

U.S. PATENT DOCUMENTS 5,836,739 A     11/1998   Haramura et al.
6,846,167 B2 *    1/2005   Jaisle .................... 417/407

FOREIGN PATENT DOCUMENTS

| JP | 60-026817 | 2/1985 |
|---|---|---|
| JP | 6-43347 | 6/1994 |
| JP | 06-207755 | 7/1994 |
| JP | 07-091760 | 4/1995 |
| JP | 08-261237 | 10/1996 |
| JP | 2623202 | 4/1997 |
| JP | 11-503223 A | 3/1999 |
| JP | 2002-095209 | 3/2002 |
| JP | 2003-065621 | 3/2003 |
| JP | 2005-240963 | 9/2005 |
| WO | 96/31744 | 10/1996 |

OTHER PUBLICATIONS

Patent Abstracts of Japan, Publication No. 2003-065621 dated Mar. 5, 2003, 1 page.

Patent Abstracts of Japan, Publication No. 2002-095209 dated Mar. 9, 2002, 1 page.

Patent Abstracts of Japan, Publication No. 60-026817 dated Feb. 9, 1985, 1 page.

Patent Abstracts of Japan, Publication No. 06-207755 dated Jul. 26, 1994, 1 page.

Patent Abstracts of Japan, Publication No. 07-091760 dated Apr. 4, 1995, 1 page.

International Search Report issued in PCT/JP2006/322560 mailed on Jan. 9, 2007, with translation, 5 pages.

Notification of Transmittal of Copies of Translation of the International Preliminary Report on Patentability (Chapter I or Chapter II of the Patent Cooperation Treaty) for International Application No. PCT/JP2006/322560, mailed on Jun. 19, 2008 (7 pages).

Patent Abstracts of Japan for Japanese Publication No. 2005-240963, Publication date Sep. 8, 2005 (1 page).

Chinese Office Action for Application No. 200680046040.3, mailed on Nov. 13, 2009 (5 pages).

* cited by examiner

MOTOR BUILT-IN MAGNETIC BEARING DEVICE

BACKGROUND OF INVENTION

1. Field of the Invention

The present invention relates to a magnetic bearing device for use in, for example, a turbine unit employed in an air cycle refrigerating system and, in particular, to a motor built-in magnetic bearing device, in which a rolling bearing unit and a magnetic bearing unit are used in combination with each other used, with the magnetic bearing unit supporting one or both of an axial load and a bearing preload.

2. Description of the Prior Art

The air cycle refrigerating system makes use of an air as a coolant and does therefore fail to exhibit a sufficient energy efficiency as compared with the refrigerating system using chlorofluorocarbon or ammonium, but is considered agreeable in terms of environmental protection. In a facility such as, for example, a cold storage warehouse into which a refrigerating air can be directly blown, the total cost can be lowered if a cooling fan device and/or defroster are dispensed with, and, accordingly, the use of the air cycle refrigerating system in such application has been suggested. (See, for example, the Japanese Patent No. 2623202.)

Also, it is well known that in a deeply cold range of −30 to −60° C., the theoretical efficiency of air refrigeration is equal to or higher than that of chlorofluorocarbon or ammonium. It is, however, said that optimally designed peripheral equipments are needed in order to secure the theoretical efficiency of the air refrigeration. Those peripheral equipments include, for example, compressors and/or expansion turbines.

For the compressor and expansion turbine, a turbine unit, in which a compressor rotor and an expansion turbine rotor are mounted on a common main shaft, is generally utilized. (See the Japanese Patent No. 2623202.)

It is to be noted that for the turbine unit used to handle a process gas, a magnetic bearing type turbine unit has been suggested, in which the turbine rotor and the compressor rotor are respectively mounted on respective opposite ends of the main shaft, which is supported by a journal bearing and a thrust bearing that can be controlled by an electric current flowing through an electromagnet. (See the Japanese Laid-open Patent Publication No. 07-91760.)

Also, although related to a suggestion concerning a gas turbine engine, the use of a thrust magnetic bearing device has been made to reduce the thrust load, acting on the rolling bearing device for the support of a main shaft, in order to avoid the possibility that the thrust load would lead to reduction in bearing lifetime. (See, for example, the Japanese Laid-open Patent Publication No. 08-261237.)

As discussed above, in order to secure the theoretical efficiency of the air cooling, at which a high efficiency can be obtained in the deeply cold range, the air cycle refrigerating system requires the use of a compressor and an expansion turbine that are optimally designed.

For the compressor and the expansion turbine as mentioned above, the turbine unit including the compressor rotor and the expansion turbine rotor both mounted on a common main shaft is utilized. This turbine unit increases the efficiency of the air cycle refrigerator in view of the fact that the compressor rotor is driven by a power induced by the expansion turbine.

However, in order to secure a practically acceptable efficiency, a clearance delimited between each of the rotors and a housing must necessarily be small. Change in clearance constitutes a cause of an unstable operation during high speed rotation and, therefore, the efficiency tends to be lowered.

Also, by the effect of air acting on the compressor rotor and the turbine rotor, the thrust force acts on the main shaft and the bearing unit supporting the main shaft is loaded with the thrust load. The rotational speed of the main shaft in the turbine unit employed in the air cycle refrigerating system is 80,000 to 100,000 revolutions per minute, which is considerably high as compared with that in the bearing unit for the standard application. For this reason, the thrust load such as described above tends to bring about a reduction in long term durability and lifetime of the bearing unit used to support the main shaft and, in turn, a reduction in reliability of the air cycle refrigerating turbine unit. Unless the problem associated with the reduction in the long-term durability of the bearing unit is resolved, the air cycle refrigerating turbine unit can be hardly placed in practical use. However, the technology disclosed in the Japanese Patent No. 2623202 has not yet resolved the problem associated with the reduction in long-term durability of the bearing unit relative to the loading of the thrust load under such a high speed revolution.

In the case of the turbine compressor of a magnetic bearing type such as disclosed in the Japanese Laid-open Patent Publication No. 07-91760, in which the main shaft is supported by the journal bearing unit and the thrust bearing unit, both in the form of a magnetic bearing, the journal bearing unit lacks a function of regulating in the axial direction. For this reason, the presence of a factor or the like that render the control of the thrust bearing unit to be unstable makes it difficult to achieve a stabilized high speed revolution while the minute clearance is maintained between the rotor and the diffuser. The magnetic bearing unit involves a problem associated with a contact between the rotor and the diffuser at the time of failure of the electric power supply.

In view of the above, in order to alleviate the foregoing problems, the inventors of the present invention have developed a motor incorporated magnetic bearing device of such a structure as shown in FIG. 15. Specifically, the motor incorporated magnetic bearing device so developed includes, in a turbine unit for use in an air cycle refrigerating system, a compressor rotor 46a of a compressor 46 and a turbine rotor 47a of an expansion turbine 47, which are mounted on opposite ends of a main shaft 53, respectively; rolling bearing units 55 and 56 for supporting a radial load acting on the main shaft 53; an electromagnet 57 for supporting an axial load acting on the main shaft 53; and a motor 68 arranged coaxially of the main shaft 53 for providing a driving force that is cooperable with a driving force brought about by the turbine rotor 47a to drive the compressor rotor 46a. The electromagnet 57 used to support the axial load is arranged in face-to-face relation without contact to a thrust plate 53a, which is mounted coaxially on the main shaft 53 so as to extend radially outwardly therefrom, and is controlled by a magnetic bearing controller 59 for the magnetic bearing unit in response to an output generated from a sensor 58 for detecting a force acting in the axial direction. The motor 68 is of an axial gap type and includes a motor rotor 68a, formed in a thrust plate 53b which is different from the thrust plate 53a and mounted coaxially on the main shaft 53 so as to extend radially outwardly therefrom, and a motor stator 68b held in an axially face-to-face relation to the motor rotor 68a. The motor 68 referred to above is controlled by a motor controller 69 independently of the electromagnet 57. Also, the stator 68b of the motor 68 is of a core equipped structure having a coil 68bb wound around an axially extending stator yoke 68ba.

In the motor incorporated magnetic bearing device of the structure described above, since a thrust force acting on the main shaft 53 can be supported by the electromagnet 57, the thrust force that acts on the rolling bearing units 55 and 56 can be relieved while suppressing an increase of the torque on a non-contact basis. As a result thereof, minute clearances between the rotors 46a and 47a and housings 46b and 47b, respectively, can be maintained at a constant value, allowing the long term durability of the rolling bearings relative to the load brought about by the thrust load.

It has, however, been found that the motor incorporated magnetic bearing device of the structure described above involves such a possibility that when the motor 68 operates in a high load region and an excessive axial load acts then, the control system for the magnetic bearing units 55 and 56 will become unstable. In other words, in the event that the excessive axial load acts, not only does the negative stiffness (which acts in a direction of displacement and a force thereof tends to increase as the displacement becomes large) in the electromagnet 57 increase, but also the negative stiffness of a magnetic coupling formed between the motor rotor 68a and the stator yoke 68ba, both forming respective parts of the motor 68, increase. For this reason, in the event that the negative stiffness of a composite spring formed by the electromagnet 57 and the motor 68 comes to be higher than the stiffness of the composite spring formed by the rolling bearing units 55 and 56 and respective support systems therefor, the control system for the magnetic bearing device will become unstable. In order to alleviate such a condition, the controller 59 is required to be provided with a phase compensating circuit or the like, resulting in complication in structure of the controller 59.

SUMMARY OF THE INVENTION

An object of the present invention is to provide a motor built-in magnetic bearing device of a type, in which the stabilized control is possible, even when an excessive axial load acts, and in which the controller can be simplified in structure.

The motor built-in magnetic bearing device according to a first construction of the present invention includes a main shaft; a flange shaped thrust plate coaxially mounted on the main shaft so as to extend perpendicular to the main shaft and made of a ferromagnetic material; a rolling bearing unit for supporting a radial load; a magnetic bearing unit for supporting one or both of an axial load and a bearing preload and having an electromagnet fitted to a spindle housing so as to confront the thrust plate, on a non-contact basis; a motor for driving the main shaft and having a motor rotor mounted on the main shaft and a motor stator arranged in face-to-face relation with the motor rotor, the main shaft being driven by a magnetic force or a Lorentz force developed between the motor rotor and the motor stator; a sensor for detecting an axial force acting on the rolling bearing unit; and a controller for controlling the electromagnet in response to an output from this sensor. In this motor built-in magnetic bearing device, a stiffness of a composite spring formed by the rolling bearing unit and a support system for the rolling bearing unit is chosen to be higher than a negative stiffness of a composite spring of a motor part. The motor part referred to above is made up of, for example, the motor and the electromagnet.

Since the motor built-in magnetic bearing device according to the first construction described above is so designed that the rolling bearing unit and the magnetic bearing unit are used in combination with each other, the rolling bearing unit is operable to support the radial load and the magnetic bearing unit is operable to support one or both of the axial load and the bearing preload, a highly precise support can be accomplished in the axial direction, the long term durability of the rolling bearing unit can be secured, and damage, which would occur at the time of a failure of the electric power in the case where the support is carried out only by the magnetic bearing unit can be avoided Also, since the stiffness of the composite spring, formed by the rolling bearing unit and the support system for the rolling bearing unit is chosen to be higher than the negative stiffness of the composite spring of the motor part formed by the electromagnet and the motor, in the control region, it is possible to avoid the phase of the mechanical system from being retarded 180°. Accordingly, the target to be controlled by the controller can be stabilized and controller can have a simplified circuit configuration utilizing a proportion or proportion plus integration.

In the motor built-in magnetic bearing device according to the first construction, the motor rotor may be mounted on the main shaft along with the thrust plate. This is rendered to be a motor built-in magnetic bearing device according to a second construction.

In the motor built-in magnetic bearing device according to the first construction, the motor may be a coreless motor. This is rendered to be a motor built-in magnetic bearing device according to a third construction.

The motor built-in magnetic bearing device according to the third construction is so designed that the motor referred to above is employed in the form of a coreless motor and, therefore, it is possible to eliminate a magnetic force between the motor rotor and the motor stator. In other words, in the case of a core built-in structure, the magnetic force developed between the motor rotor and the stator yoke acts as a negative stiffness in the axial direction, but where the coreless motor is employed such as in this construction, the negative stiffness acting on the motor can be rendered to be null. As a result thereof, even in a condition in which the high load acts on the motor, that is, an excessive axial load acts, it is possible to maintain the relation, in which the stiffness of the composite spring formed by the rolling bearing unit and the support system for the rolling bearing unit is higher than the negative stiffness of the composite spring of the motor part formed by the electromagnet and the motor.

In the motor built-in magnetic bearing device according to the first construction, the motor referred to above may be a motor of an axial gap type and the motor rotor may be arranged on one or both of opposite surfaces of the thrust plate in which an electromagnet target of the electromagnet is arranged. This is rendered to be a motor built-in magnetic bearing device according to a fourth construction.

In the motor built-in magnetic bearing device according to the fourth construction, since the motor rotor of the motor of the axial gap type is arranged on one or both of the opposite surfaces of the thrust plate together with the electromagnet target, there is no need to provide any extra thrust plate, which will become an electromagnet target and which is different from the thrust plate for the motor, on the main shaft and, therefore, the main shaft can have a reduced shaft length, accompanied by an increase of the natural frequency of the main shaft and the main shaft can be driven at a high speed.

The motor built-in magnetic bearing device according to the first construction may be so designed that the motor referred to above is a coreless motor of an axial gap type for driving the main shaft by means of a Lorentz force developed between the motor rotor and the motor stator; and that the thrust plate is provided in two in number, the two thrust plates being spaced a distance from each other in the axial direction; an electromagnet target is formed in each of respective surfaces of those thrust place that are opposed away from each other; permanent magnets for the motor rotor are arranged in other respective surfaces of the thrust plates that confront with each other and are equidistantly spaced from each other in a circumferential direction; the magnetic poles of the permanent magnets on one of the thrust plates are opposed to the magnetic poles of the permanent magnets on the other of the thrust plates, and the motor stator is arranged so as to be sandwiched between the permanent magnets on the opposed surfaces and fitted to the spindle housing. This is rendered to be a motor built-in magnetic bearing device according to a fifth construction. The two thrust plates referred to above are those formed integrally with the main shaft.

In the motor built-in magnetic bearing device according to the fifth construction, since the electromagnets are arranged on axially outer sides of the two thrust plates, provided on the main shaft in axially juxtaposed relation to each other, to thereby form a magnetic bearing unit, and the motor of the axial gap type is arranged at a location sandwiched between the two thrust plates to thereby form a motor unit, the magnetic bearing unit and the motor unit can be formed as a compact unitary structure. For this reason, as compared with the case in which the two, left and right electromagnets are arranged on respective sides of one thrust plate on the main shaft and left and right, two motors of the axial gap type are arranged on respective sides of an additional axial plate provided on the main shaft separately to thereby form a motor unit, the main shaft can have a reduced shaft length, accompanied by an increase of the natural frequency of the main shaft and the main shaft can be driven at a high speed.

In the motor built-in magnetic bearing device according to the fifth construction, a collar may be formed in an outer diametric portion of each of the confronting surfaces of the thrust plate. This is rendered to be a motor built-in magnetic bearing device according to a sixth construction.

In the motor built-in magnetic bearing device according to the sixth construction, since the thrust plate has an outer diametric portion formed with the collar, it is possible to avoid scattering of the permanent magnet from the thrust plate under the influence of the centrifugal force developed during the rotation of the main shaft, even when the bonding strength of the bonding agent used to secure the permanent magnet for the motor rotor to the thrust plates is deteriorated thermally or with passage of time.

The motor built-in magnetic bearing device according to the sixth construction may be so designed that the confronting surfaces of the thrust plates and formed with the permanent magnets, root portions of the thrust plates and collars formed in outer diametric portions of the thrust plates and root portions of those collars are subjected to a carburizing treatment. This is rendered to be a motor built-in magnetic bearing device according to a seventh construction.

In the motor built-in magnetic bearing device according to the seventh construction, since the confronting surfaces formed with the permanent magnets, root portions of the thrust plates and collars formed in outer diametric portions of the thrust plates and root portions of those collars are subjected to a carburizing treatment, they can withstand against the excessive stress, which may be centered on those portions during the high speed rotation, to thereby avoid a centrifugal destruction, allowing the thrust plates, which form the electromagnet targets, to have a required excellent magnetic characteristic and a required high strength concurrently. In other words, since the excessive stresses are centered on those portions during the high speed rotation, the centrifugal destruction is likely to occur if the main shaft and the thrust plate are made of a low carbon steel excellent in magnetic characteristic, but this construction is effective to avoid such problem. Accordingly, there is no need to increase the thickness of each of the thrust plate while they have an excellent magnetic characteristic, and, therefore, the main shaft can have a reduced shaft length, accompanied by an increase of the natural frequency of the main shaft and the main shaft can be driven at a high speed.

The motor built-in magnetic bearing device according to the first construction may be applied to a compression expansion turbine system, in which a compressor rotor and a turbine rotor are mounted on the main shaft together with the thrust plate and the compressor rotor is driven by one or both of respective powers generated by the motor and the turbine rotor. This is rendered to be a motor built-in magnetic bearing device according to an eighth construction.

In the motor built-in magnetic bearing device according to the eighth construction, a stabilized high speed rotation of the main shaft can be obtained while a proper clearance is maintained between the rotors and, hence, the long term durability and the lifetime of the bearing can be obtained.

The motor built-in magnetic bearing device according to the eighth construction may be so designed that the compression expansion turbine system, to which the motor built-in magnetic bearing device is applied, is applied to an air cycle refrigerating system in which an incoming air is subjected sequentially to compression by means of a compressor including the compressor rotor in the turbine unit, cooling by means of a different heat exchanger, and adiabatic expansion by means of an expansion turbine including the turbine rotor in the turbine unit. Alternatively, the incoming air may be subjected sequentially to compression by means of a pre-compressing unit, cooling by means of a heat exchanger, compression by means of the compressor, cooling by means of the different heat exchanger, and adiabatic expansion by means of the expansion turbine. This is rendered to be a motor built-in magnetic bearing device according to a ninth construction.

Where the compression expansion turbine system to which the motor built-in magnetic bearing device is applied is applied to the air cycle refrigerating system, since in the compression expansion turbine system, a stabilized high speed revolution of the main shaft can be obtained while the proper clearances of the rotors are maintained, and the long term durability and the lifetime of each of the bearing units can be increased, the reliability of the turbine unit as a whole and, hence, that of the air cycle refrigerating system as a whole can be increased. Since the stabilized high speed revolution, the long term durability and the reliability of the main shaft bearing units of the turbine unit, which has hitherto been posed a major bottleneck to the air cycle refrigerating system, can be increased, the air cycle refrigerating system has now come to be employed practically.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
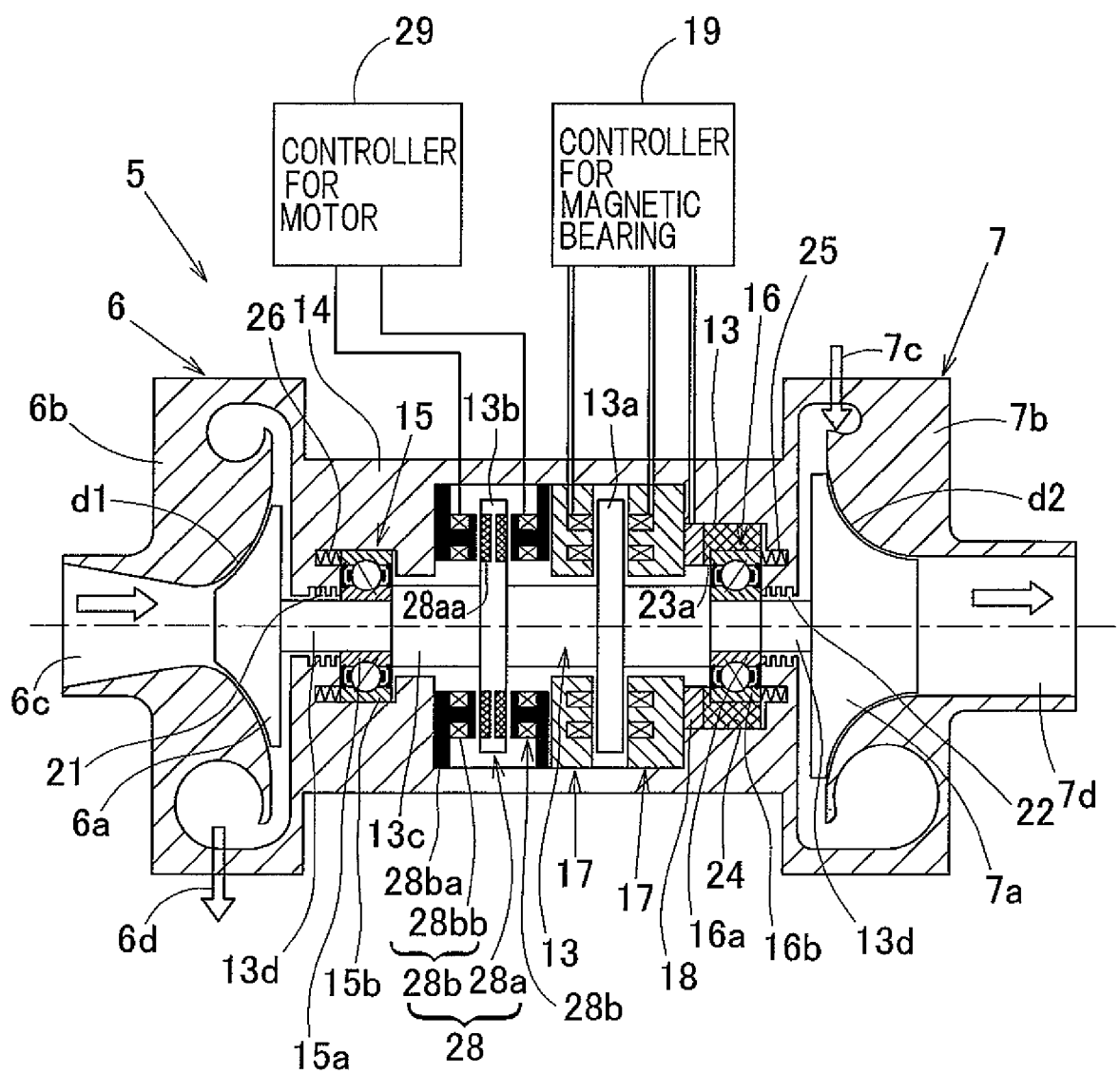
FIG. 1 is a longitudinal sectional view of a turbine unit incorporating therein a motor built-in magnetic bearing device according to a first and a third preferred embodiments of the present invention.

A first preferred embodiment of the present invention will now be described with particular reference to FIGS. 1 to 3. FIG. 1 illustrates a sectional view of a turbine unit, which incorporates therein a motor built-in magnetic bearing device according to first and third preferred embodiment of the present invention. The illustrated turbine unit 5 forms a part of a compressor expander turbine system and includes a compressor 6 having a compressor rotor 6a and an expansion turbine 7 having a turbine rotor 7a, the compressor and turbine rotors 6a and 7a being mounted on respective opposite ends of a main shaft 13. As a material for the main shaft 13, a low carbon steel excellent in magnetic characteristic is used.

Referring to FIG. 1, the compressor 6 includes a compressor housing 6b corresponding to a diffuser and confronting the compressor rotor 6a with a minute clearance d1 intervening between the housing 6b and the compressor rotor 6a and is operable to compress the air, which is sucked axially from an air intake opening 6c at a center portion thereof, with the compressor rotor 6a and then to discharge, in a direction shown by the arrow 6d, the compressed air from an exit (not shown) defined in an outer peripheral portion thereof.

The expansion turbine 7 includes a turbine housing 7b confronting the turbine rotor 7a with a minute clearance d2 intervening between the turbine housing 7b and the turbine rotor 7a and is operable to adiabatically expand the air, which is sucked from an outer peripheral portion thereof in a direction shown by the arrow 7c, with the turbine rotor 7a and then to discharge the expanded air from a discharge opening 7d at a center portion thereof.

The motor built-in magnetic bearing device in this turbine unit 5 is of a design, in which a radial load acting on the main shaft 13 is supported by a plurality of bearing units 15 and 16 and one or both of an axial load and a bearing preload acting on the main shaft 13 are supported by electromagnets 17, which is a magnetic bearing unit. The motor built-in magnetic bearing device also includes a motor 28 of an axial gap type for driving the main shaft 13. This turbine unit 5 includes sensors 18 for detecting a thrust force acting on the main shaft 13, a magnetic bearing controller 19 for controlling a main shaft supporting force exerted by each of the electromagnets 17 in response to an output of the sensors 18 and a motor controller 29 for controlling the motor 28 independently of the electromagnets 17.

The electromagnets 17 are arranged in a spindle housing 14 so as to confront, on a non-contact basis, respective opposite surfaces of a flange shaped thrust plate 13a made of a ferromagnetic material and mounted coaxially on the main shaft 13 so as to extend radially outwardly therefrom at a location generally axially intermediate portion of the main shaft 13 and on a side close to the expansion turbine 7.

The motor 28 includes a motor rotor 28a, mounted on the main shaft 13 in a juxtaposed relation with the thrust plate 13a, and motor stators 28b axially confronting the motor rotors 28a. The motor rotors 28a are constructed by arranging circumferentially juxtaposed permanent magnets 28aa on respective opposite surfaces of a flange shaped thrust plate 13b, mounted coaxially on the main shaft 13 so as to extend radially outwardly therefrom at a location generally axially intermediate portion of the main shaft 13 and on a side close to the compressor 6, with the thrust plate 13b serving as back yokes therefor. Each of the motor stators 28b includes a stator yoke 28ba, made of a ferromagnetic material and arranged in the spindle housing 14 so as to confront, on a non-contact basis, one surface of the motor rotor 28a, and a coil 28bb wound around the respective stator yoke 28ba. This motor 28 is operable to rotate the main shaft 13 by means of a magnetic force or Lorentz force developed between the motor rotors 28a and the motor stators 28b. It is to be noted that in the motor 28 of the axial gap type, the magnetic force developed between the motor rotors 28a and the stator yokes 28ba acts as a negative stiffness in the axial direction.

Each of the bearing units 15 and 16 for the support of the main shaft 13 is a rolling bearing having a function of regulating an axial position and is employed in the form of, for example, a deep groove ball bearing or an angular contact ball bearing. In the case of the deep groove ball bearing, it has a thrust bearing function in both directions and works to return respective axial positions of inner and outer rings back to a neutral position. Those two bearing units 15 and 16 are arranged in the spindle housing 14 at respective locations adjacent the compressor rotor 6a and the turbine rotor 7a.

The main shaft 13 is of a stepped configuration having a large diameter portion 13c at an intermediate portion thereof and reduced diameter portions 13d at opposite ends thereof. Each of the bearing units 15 and 16 has an inner rig 15a and 16a, mounted on the corresponding reduced diameter portion 13d in a press-fitted fashion, and also has one end face engaged with a step defined between the large diameter portion 13c and the reduced diameter portion 13d.

Portions of the spindle housing 14 on one side of the bearing units 15 and 16 adjacent the rotors 6a and 7a the bearing units 15 and 16, respectively, have a respective inner diametric surface formed to a diameter enough to allow it to come close to the main shaft 13 and non-contact seals 21 and 22 are formed in those inner diametric surfaces, respectively. Although the non-contact seals 21 and 22 are employed each in the form of a labyrinth seal defined by a plurality of circumferential grooves arranged in the corresponding inner diametric surface of the spindle housing 14 in a direction axially thereof, any other non-contact sealer can be employed therefor.

The sensors 18 are provided on a stationary side of the bearing unit 16 adjacent the turbine rotor 7a, that is, on the side of the spindle housing 14. The bearing unit 16 adjacent where the sensors 18 are arranged has an outer ring 16b mounted fixedly in a bearing housing 23. The bearing housing 23, formed in a ring shape, has one end formed with an inner collar 23a engaged with an end face of the outer ring 16b of the bearing unit 16 and is axially movably mounted on an inner diametric surface 24 provided in the spindle housing 14. This inner collar 23a is provided at the one end axially inwardly of the housing 23.

The sensors 18 are arranged at respective locations, for example, two locations in a circumferential direction around the main shaft 13 and are interposed between one end face of the bearing housing 23 adjacent the inner collar 23a and the electromagnet 17 which is a member fixed to the spindle housing 14. Also, the sensors 18 are preloaded by a sensor preload spring 25. This sensor preload spring 25 is accommodated within an accommodating recess defined in the spindle housing 14 for urging the outer ring 16b of the bearing unit 16 in the axial direction and applies the preload to the sensors through the outer ring 16b and the bearing housing 23. The sensor preload spring 25 may include, for example, coiled springs provided at a plurality of circumferential locations around the main shaft 13.

The preload applied by the sensor preload spring 25 is for the purpose of enabling the sensors 18, which detect a thrust force by means of a pressing force, to detect relative to a movement of the main shaft 13 in any one of axial directions, and is chosen to be of a value higher than an average thrust force that acts on the main shaft 13 during an ordinary operating condition of the turbine unit 5.

The bearing unit 15 on the side where no sensor 18 is arranged is axially movably arranged relative to the spindle housing 14 and is elastically supported by a bearing preload spring 26. In the instance as shown, an outer ring 15b of the bearing unit 15 is axially movable mounted on the inner diametric surface of the spindle housing 14 and the bearing preload spring 26 is interposed between the outer ring 15b and the spindle housing 14. The bearing preload spring 26 is opposed to a stepped face of the main shaft 13, with which an end face of an inner ring 15a is engaged, to urge the outer ring 15b to thereby apply a preload to the bearing unit 15. This bearing preload spring 26 is in the form of coil springs or the like provided at a plurality of circumferential locations around the main shaft 13 and is accommodated within an accommodating recess defined in the spindle housing 14. The bearing preload spring 26 has a spring constant smaller than that of the sensor preload spring 25.

The dynamic model of the motor built-in magnetic bearing device employed in the turbine unit 5 of the structure described above can be illustrated by means of a simple spring system. In other words, this spring system includes a composite spring, defined by the bearing units 15 and 16 and a support system of those bearing units (including the sensor preload spring 25, the bearing preload spring 26, the bearing housing 23 and others), and a composite spring defined by a motor part comprised of the electromagnets 17 and the motor 28, these composite springs being arranged in parallel relation to each other. In this spring system, the composite spring defined by the bearing units 15 and 16 and the support system thereof represents a stiffness which acts in a direction counter to the direction of displacement and in proportion to the amount of such displacement, whereas the composite spring defined by the motor part comprised of the electromagnets 17 and the motor 28 represents a negative stiffness which acts in a direction conforming to the direction of displacement and in proportion to the amount of such displacement.

For this reason, if the relation in magnitude between the respective rigidities of the composite springs referred to above is expressed by the following formula:

$$\text{Stiffness of Composite Spring of Bearing Units and other} < \text{Negative Stiffness of Composite Spring of Motor Part} \quad (1)$$

the mechanical system will have a 180° retarded phase and will hence pose an unstable system and, accordingly, the magnetic bearing controller 19 for controlling the electromagnets 17 will require a phase compensating circuit to be added thereto, rendering the controller 19 to be complicated in structure.

In view of the above, in the motor built-in magnetic bearing device according to this embodiment, the relation in magnitude between the composite springs referred to above is so chosen as to be expressed by the following formula:

$$\text{Stiffness of Composite Spring of Bearing Units and other} > \text{Negative Stiffness of Composite Spring of Motor Part} \quad (2)$$

Figure 2:
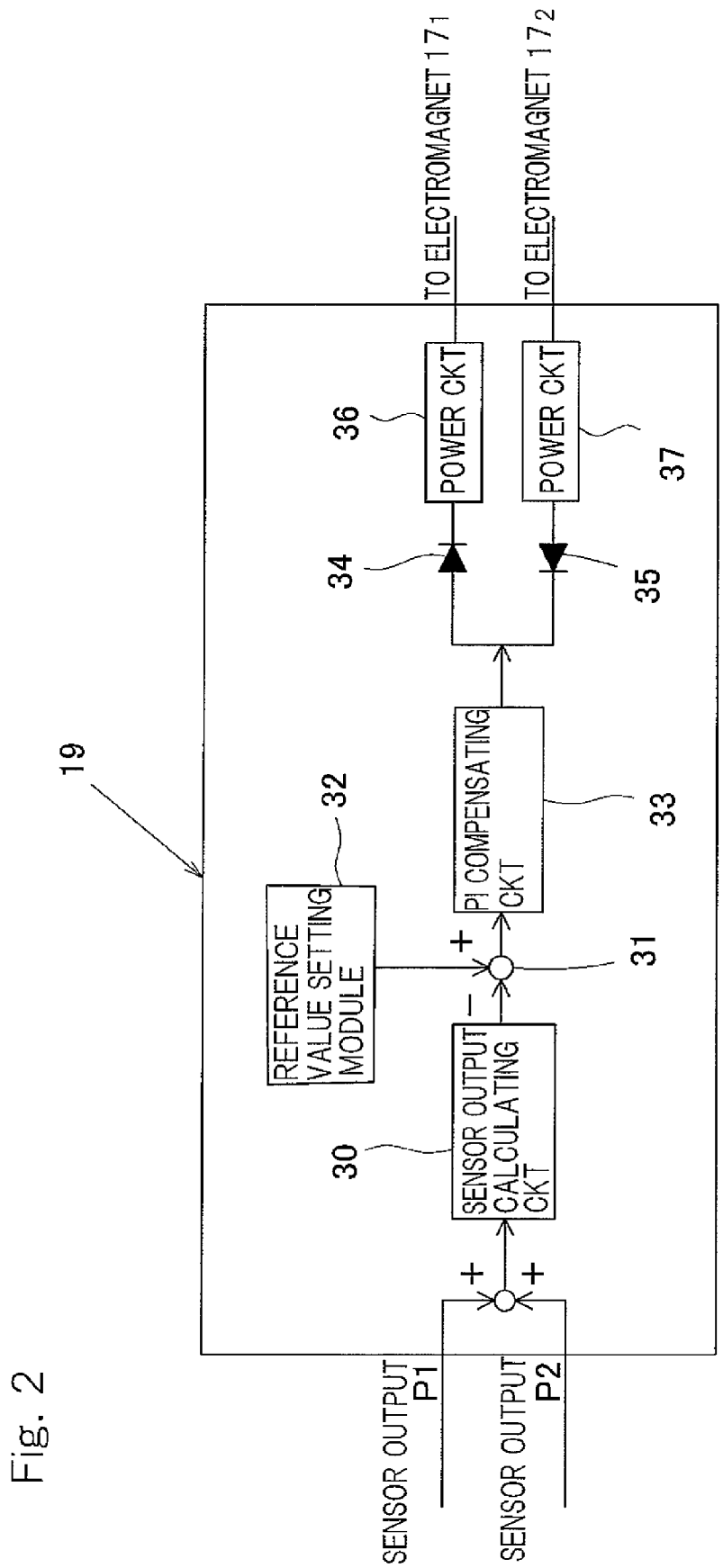
FIG. 2 is a circuit block diagram showing one example of a magnetic bearing controller employed in the motor built-in magnetic bearing device.

Thus, by so setting the relation in magnitude between the respective rigidities of the composite springs as hereinabove described, it is possible to avoid the possibility that the phase of the mechanical system is retarded 180° in the control region and, therefore, even when an excessive thrust load acts, a target to be controlled by the magnetic bearing controller 19 can be stabilized and the controller 19 can have a simplified circuit configuration utilizing proportion or proportion plus integration as shown in FIG. 2.

In the magnetic bearing controller 19 shown in a circuit block diagram in FIG. 2, detection outputs P1 and P2 from the sensors 18 are added or subtracted each other by a sensor output calculating circuit 30; a result of calculation so obtained is compared by a comparator 31 with a reference value, fed from a reference value setting unit 32, to calculate a deviation; and a deviation so calculated is finally subjected to proportion plus integration (or proportion) that is suitably set by an PI compensating circuit (or a P compensating circuit) 33 according to the turbine unit 5, whereby control signals to be applied to the electromagnets 17 can be calculated. An output from the PI compensating circuit (or the P compensating circuit) 33 is supplied through diodes 34 and 35 to power circuits 36 and 37 for driving the electromagnets $17_1$ and $17_2$ in the directions, respectively. The electromagnets $17_1$ and $17_2$ correspond respectively to the electromagnets 17 opposed to the thrust plate 13a shown in FIG. 1 and since only the magnetic force of attraction acts, respective directions of flow of electric currents are determined beforehand by the diodes 34 and 35 so that the electromagnets $17_1$ and $17_2$ can be selectively driven.

Figure 3:
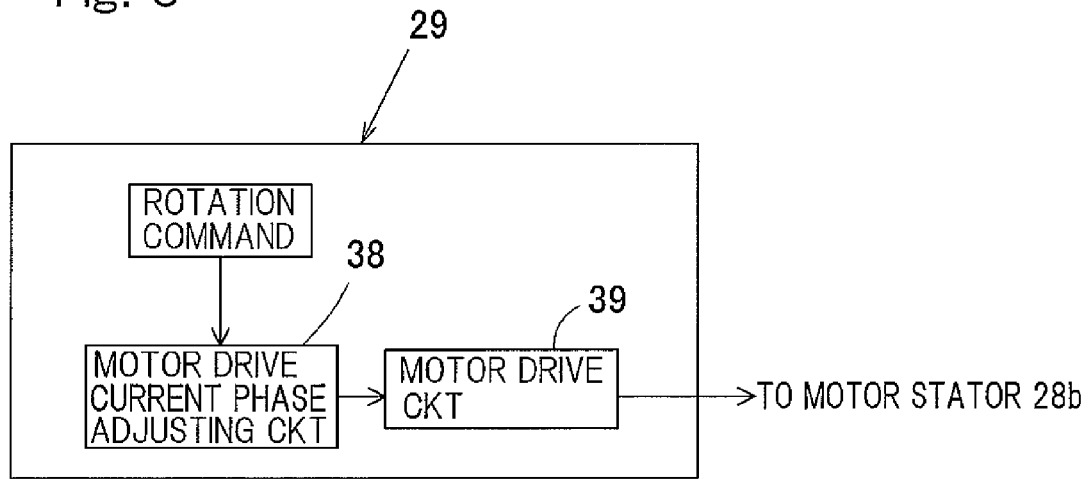
FIG. 3 is a circuit block diagram showing one example of a motor controller employed in the motor built-in bearing device.

In the motor controller 29 shown in a circuit block diagram in FIG. 3, based on a rotation synchronizing command, the phase adjustment of a motor drive current is carried out by a phase adjusting circuit 38 with the use of the rotation angle of the motor rotor 28a as a feedback signal, and the motor drive current so adjusted is supplied from a motor drive circuit 39 to the motor stators 28b so that a constant rotation control can be carried out. The rotation synchronizing command referred to above is calculated in dependence on an output generated from a rotation angle detecting sensor (not shown) provided in the motor rotor 28a.

The turbine unit 5 of the structure described hereinbefore is applied to, for example, an air cycle refrigerating system. And the unit 5 is so used that, in order to enable the air, which will become a coolant, to accomplish a heat exchange efficiently in a heat exchanger (not shown) in the subsequent stage, the air is compressed by the compressor 6 to boost the temperature and the air, which is cooled by the heat exchanger in the subsequent stage, is cooled by the expansion turbine 7 down to a target temperature, which is a very low temperature of, for example, −30 to −60° C., by means of adiabatic expansion before the air is discharged.

In this example as discussed above, in this turbine unit 5, the compressor rotor 6a and the turbine rotor 7a are mounted on the main shaft 13, which is a common to the thrust plate 13a and the motor rotor 28a, and the compressor rotor 6a is driven by one or both of a power generated by the motor 28 and a power generate by the turbine rotor 7a. Because of this, a stable high speed revolution of the main shaft 13 can be obtained while maintaining the proper clearances d1 and d2 for the rotors 6a and 7a, respectively, and an increase of the long term durability and that of the lifetime of the bearing units 15 and 16 can be obtained.

In other words, in order to secure the efficiency of compression and expansion of the turbine unit 5, it is necessary to maintain the respective clearances d1 and d2 between the rotors 6a and 7a and the housings 6b and 7b at a small value. By way of example, where this turbine unit 5 is applied to the air cycle refrigerating system, it is important to secure the efficiency of compression and expansion of the turbine unit 5. In this respect, since the main shaft 13 is supported by the rolling bearing units 15 and 16, the axial position of the main shaft 13 can be regulated to a certain extent by the function of the rolling bearings to regulate the position in the axial direction and, accordingly, the respective the clearances d1 and d2 between the rotors 6a and 7a and the housings 6b and 7b are kept at a constant value.

However, the main shaft 13 of the turbine unit 5 is subjected to a thrust force by the effect of, for example, a pressure of the air acting on each of the rotors 6a and 7a and a magnetic force brought about by the motor 28. Also, in the case of the turbine unit 5 used in an air cooling system, the main shaft 13 rotates at a very high speed of, for example, 80,000 to 100,000 revolutions per minute. For these reasons, when the thrust force of a kind discussed above acts on the rolling bearing units 15 and 16 then supporting the main shaft 13 rotatably, the long term durability of those bearing units 15 and 16 tends to be lowered.

This embodiment of the present invention now under discussion is effective in that since the thrust force of the kind discussed above is supported by the electromagnets 17, the thrust force acting on the rolling bearing units 15 and 16 for the support of the main shaft 13 can be reduced while suppressing an increase of a torque on a non-contact basis. In this case, since the provision has been made of the sensors 18 for detecting the thrust force, acting on the main shaft 13, and the magnetic bearing controller 19 for controlling the supporting force exhibited by the electromagnets 17 ($17_1$ and $17_2$) in response to the outputs from the sensors 18, the rolling bearing units 15 and 16 can be used in an optimum condition against the thrust force in dependence on the specifications of those bearing units.

In particular, since the sensors 18 are positioned in proximity of the bearing unit 16, the thrust force acting on the bearing unit 16 in question can be measured directly and the accuracy of such measurement is high, making it possible to control the thrust force precisely.

Figure 4:
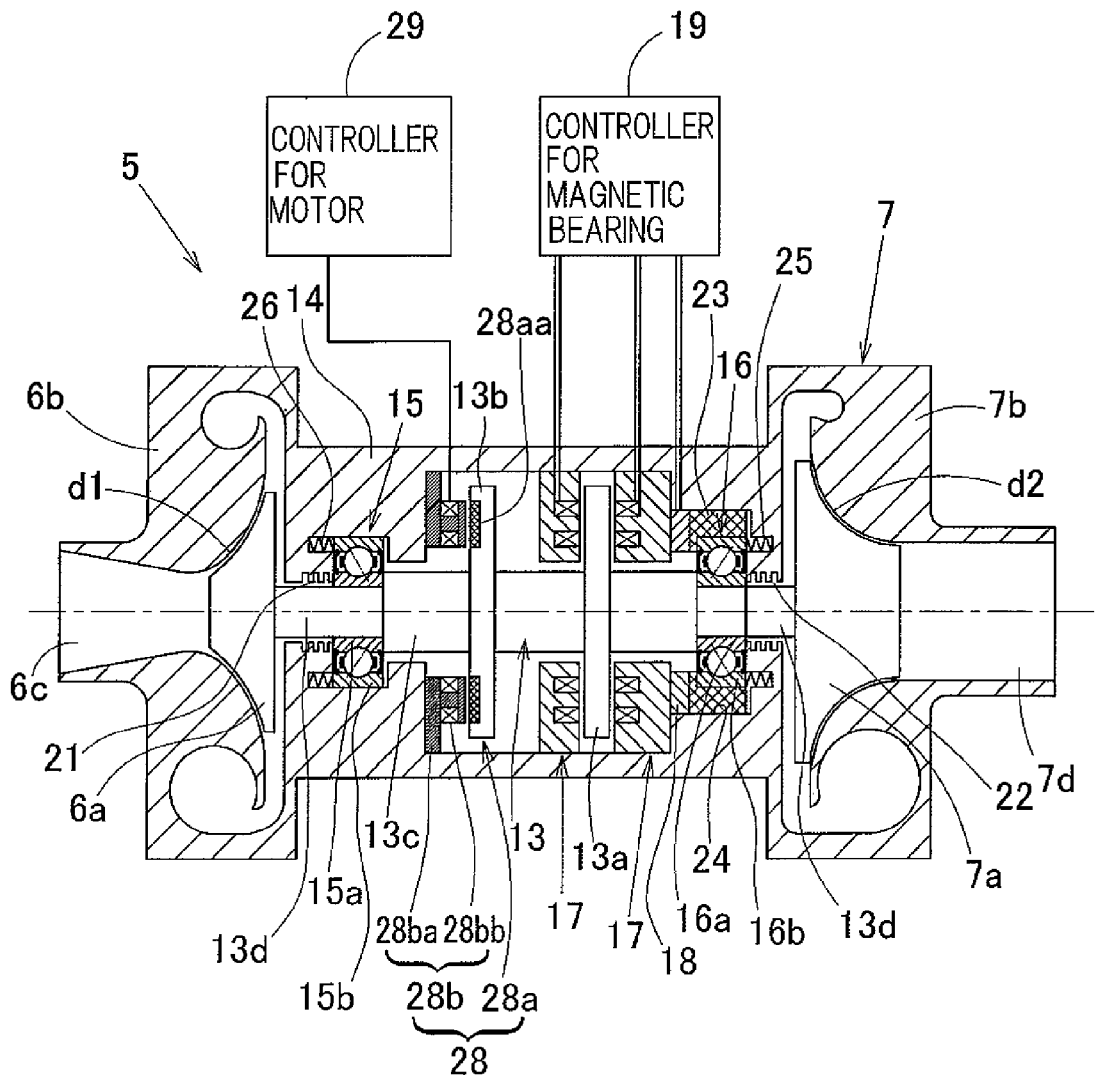
FIG. 4 is a longitudinal sectional view of the turbine unit incorporating therein the motor built-in magnetic bearing device according to a second preferred embodiment of the present invention.

FIG. 4 illustrates a second preferred embodiment of the present invention. This second embodiment is similar to the motor built-in magnetic bearing device according to the first embodiment shown in and described with particular reference to FIG. 1, but differs therefrom in that the motor 28 of the axial gap type is comprised of a motor rotor 28a including a permanent magnet 28aa, arranged in one surface of the thrust plate 13b, and a motor stator 28b provided in the spindle housing 14 so as to confront, on a non-contact basis, that one surface on the side where the permanent magnet 28aa of the motor rotor 28a is arranged. Other structural features than those described above are similar to those shown and employed in the first embodiment described hereinbefore.

In the next place, a third preferred embodiment of the present invention will be described together with FIG. 1, reference to which has been made in connection with the first embodiment of the present invention. It is to be noted that the details of elements in this embodiment, which are common to those in the first embodiment, are not reiterated for the sake of brevity.

The motor stator 28b of the motor 28 is of a structure, in which a pair of stator yokes 28ba made of a ferromagnetic material and arranged in the spindle housing 14 are provided with respective coils 28bb in a fashion without any core. This motor 28 rotates the main shaft 13 by means of a Lorentz force developed between the motor rotors 28a and the motor stators 28b. Thus, since the motor 28 of the axial gap type in this third embodiment is employed in the form of a coreless motor, the negative stiffness brought about by a magnetic coupling between the motor rotors 28a and the motor stators 28b is zero.

In other words, in this motor built-in magnetic bearing device, since the motor 28 of the axial gap type is employed in the form of a coreless motor, it is possible to render the negative stiffness, which acts on the motor 28, to be zero and, even in a condition in which a high load acts on the motor 28, the relation in magnitude as expressed by the formula (2) discussed hereinbefore can be maintained.

As a result, in the control region, it is possible to avoid the phase of the mechanical system from being retarded 180° and, accordingly, even when the maximum load acts, the target to be controlled by the controller 19 can be stabilized and controller 19 can have a simplified circuit configuration utilizing a proportion or proportion plus integration as shown in FIG. 2 in connection with the first embodiment.

Figure 5:
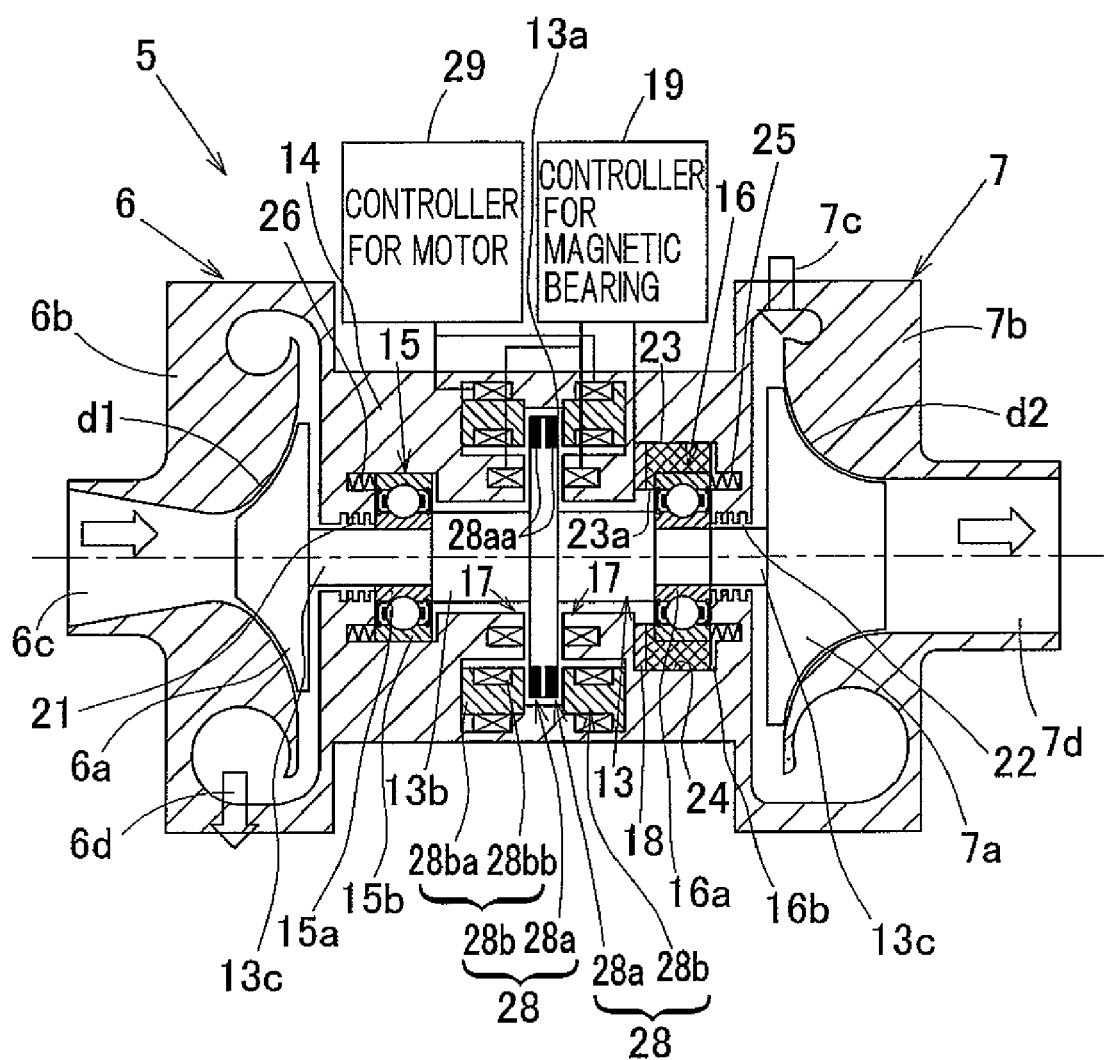
FIG. 5 is a longitudinal sectional view of the turbine unit incorporating therein the motor built-in magnetic bearing device according to a fourth preferred embodiment of the present invention.

In the next place, a fourth preferred embodiment of the present invention will be described with particular reference to FIG. 5. FIG. 5 illustrates a longitudinal sectional view of the turbine unit 5 incorporating therein the motor built-in magnetic bearing device according to this embodiment. In this embodiment, component parts shown in and described in connection with this embodiment, which are similar to those shown in and described in connection with the first embodiment, are designated by like reference numerals employed in connection with the first embodiment and, therefore, the details thereof are not reiterated for the sake of brevity.

In this fourth preferred embodiment, the electromagnets 17 are arranged in the spindle housing 14 so as to confront, on a non-contact basis, the opposite surfaces of the flange shaped thrust plate 13a made of a ferromagnetic material, which plate 13a is mounted coaxially on an intermediate portion of the main shaft 13 so as to extend radially outwardly therefrom and which is used as an electromagnet target.

The motor 28 includes motor rotors 28a, mounted on the main shaft 13, and motor stators 28b axially opposed to the motor rotors 28a. The motor rotors 28a constructed by arranging permanent magnets 28aa on respective outer diametric portions of the opposite surfaces of the thrust plate 13a remote from the remaining portions thereof, which confront the associated electromagnets 17, so as to be equidistantly spaced from each other in a direction circumferentially thereof. Between the permanent magnets 28aa so arranged as to oppose axially relative to each other, magnetic poles thereof are so set as to be different from each other. Since the a low carbon steel excellent in magnetic characteristic is used for the main shaft 13, the thrust plate 13a so provided as to be a structure integral with the main shaft 13 concurrently serves as a back yoke for the permanent magnets 28aa.

The motor stators 28b are constructed by winding motor coils 28bb respectively around the stator yokes 28ba, which are made of a ferromagnetic material (for example, a low carbon steel and a silicon steel plate) arranged on the spindle housing 14 so as to confront, on a non-contact basis, the associated motor rotors 28a on the opposite surfaces of the thrust plate 13a. In other words, each of the motor stators 28b includes a stator yoke 28ba, made of a ferromagnetic material and arranged in the spindle housing 14 so as to confront, on a non-contact basis, one surface of the motor rotor 28a, and a coil 28bb wound around the respective stator yoke 28ba. This motor 28 is operable to rotate the main shaft 13 by means of a magnetic force developed between the motor rotors 28a and the motor stators 28b. It is to be noted that in the left and right motors 28 of the axial gap type and sandwiching the thrust plate 13a in the manner described above, the magnetic force developed between the motor rotors 28a and the stator yokes 28ba acts as a negative stiffness in the axial direction. In such case, since the position of the motor rotors 28a relative to the thrust plate 13a is chosen to be on an outer diametric side of the position at which the electromagnets 17 are opposed, a further large torque can be obtained with a minimized motor drive current.

As described above, since the motor rotors 28a of the motor 28 of the axial gap type is arranged on the opposite surfaces of the thrust plate 13a, mounted on the main shaft 13, in common to the electromagnet target, there is no need to provide the main shaft 13 with a thrust plate, which forms an electromagnet target, separate from the thrust plate for the motor 28 and the main shaft 13 can have a reduced shaft length accompanied by an increase of the natural frequency of the main shaft 13 and, therefore, the main shaft 13 can be driven at a high speed.

It is to be noted that although in this embodiment now under discussion, the motor 29 of the axial gap type has been shown and described as employed in two and positioned on respective sides of the thrust plate 13a, arrangement may be made that only one motor 28 of the axial gap type is arranged on one side of the thrust plate 13a.

Figure 6:
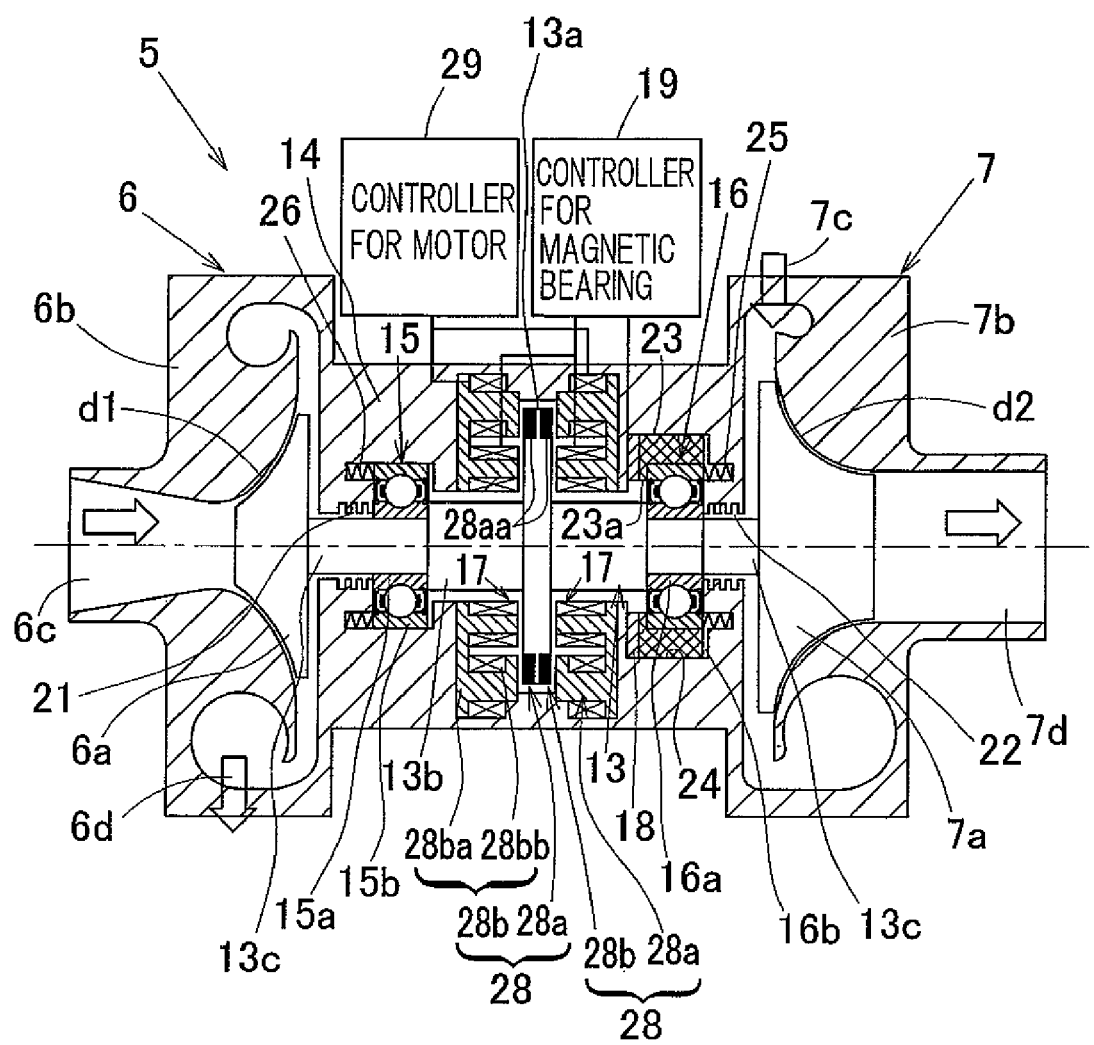
FIG. 6 is a longitudinal sectional view of the turbine unit incorporating therein the motor built-in magnetic bearing device according to a fifth preferred embodiment of the present invention.

FIG. 6 illustrates a fifth preferred embodiment of the present invention. This embodiment is so designed that in the motor built-in magnetic bearing device according to the fourth embodiment shown in and described with particular reference to FIG. 5, the back yoke of the electromagnet 17 is made of an unitary ferromagnetic material (for example, a low carbon steel and a silicon steel plate) common to the stator yoke 28ba, which is the back yoke of the motor stator 28b. Other structural features than those described above are similar to those shown and described in connection with the fourth embodiment of the present invention.

As described above, when the back yoke of the electromagnet 17 and the back yoke 28ba of the motor stator 28b (stator yoke 28ba) are of an integral structure, handling of the motor stator 28b and the electromagnet 17, which is a component part, can be facilitated to facilitate assemblage or the like.

Figure 7:
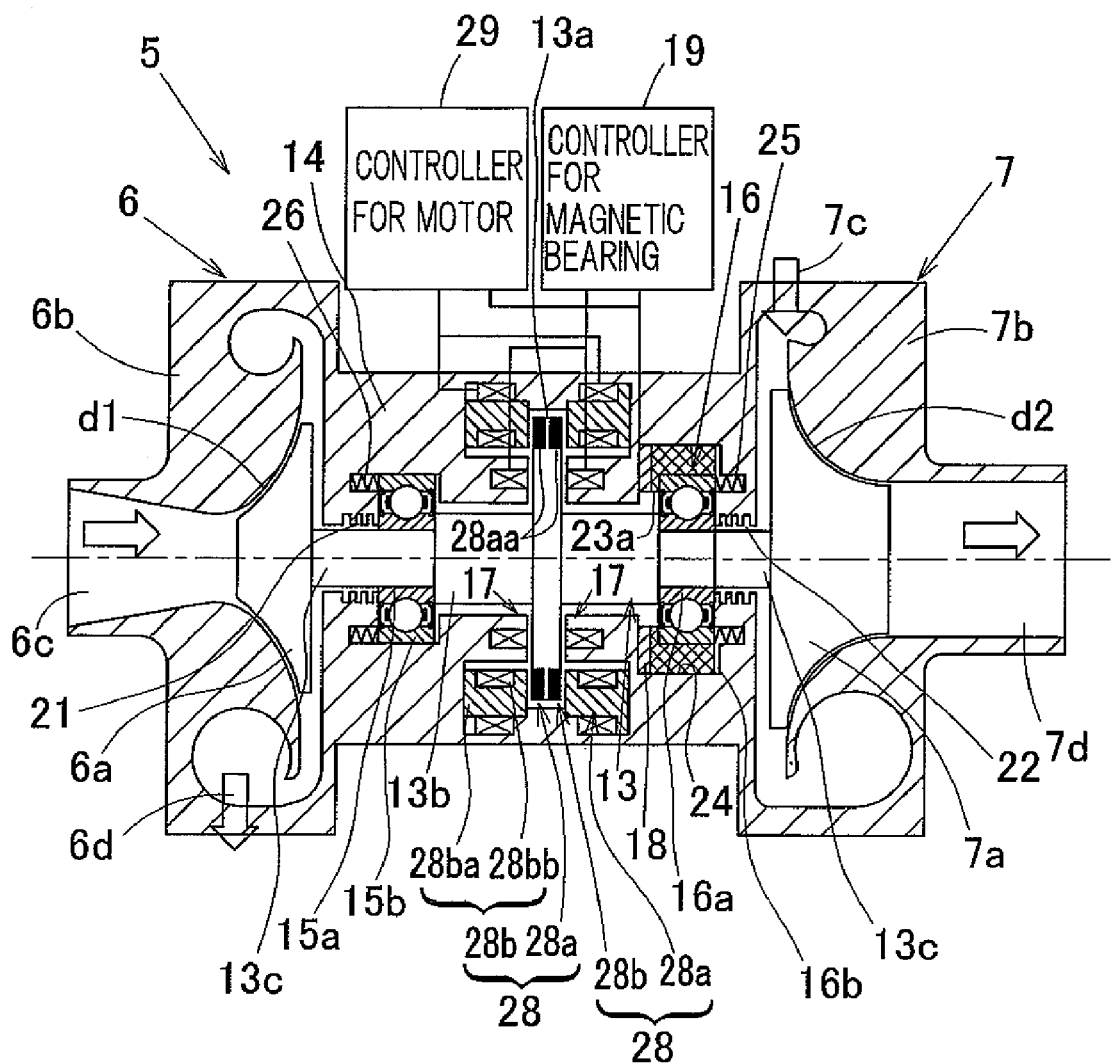
FIG. 7 is a longitudinal sectional view of the turbine unit incorporating therein the motor built-in magnetic bearing device according to a sixth preferred embodiment of the present invention.
Figure 8:
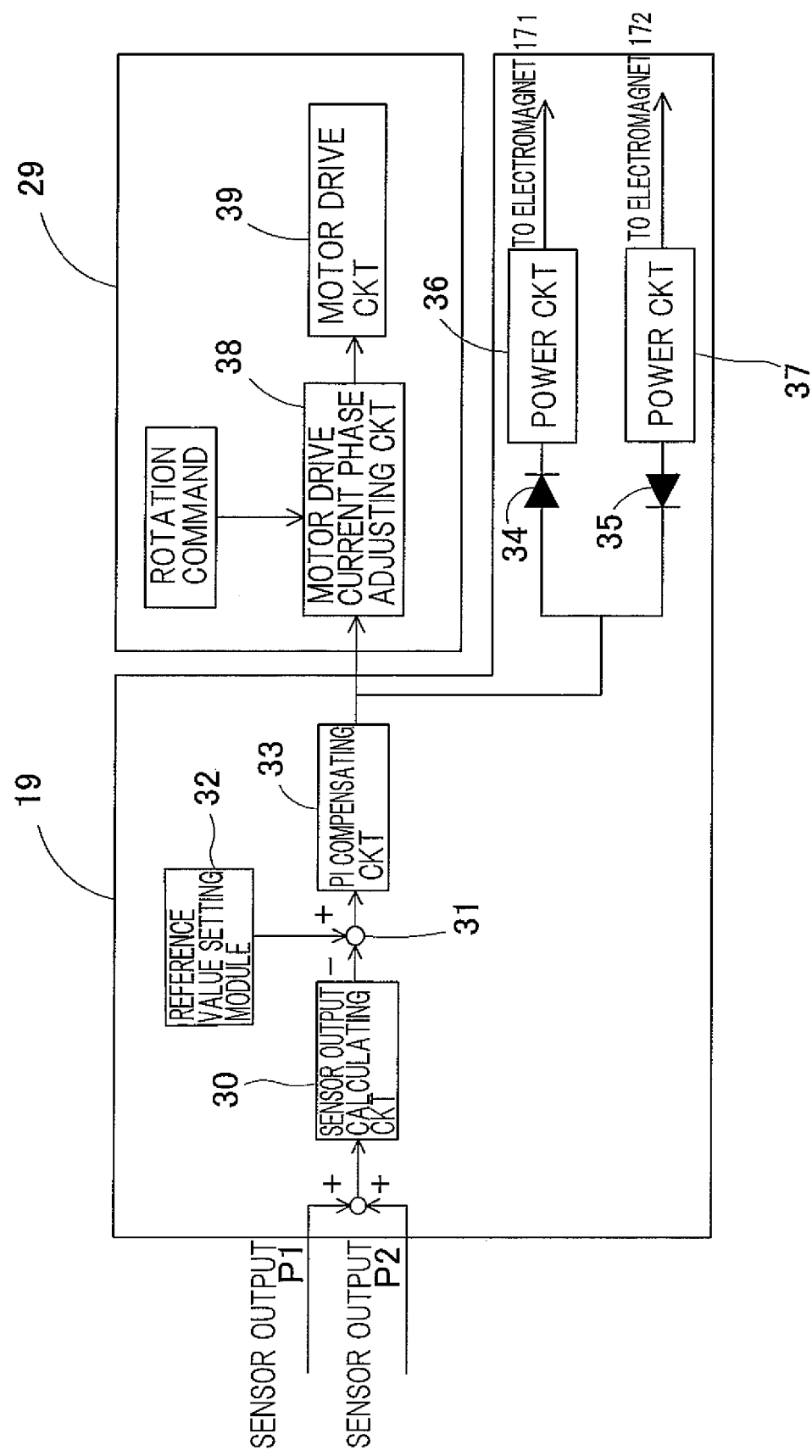
FIG. 8 is a circuit block diagram showing one example of the magnetic bearing controller and one example of the motor controller, which are employed in the motor built-in magnetic bearing device according to the sixth preferred embodiment of the present invention.

FIGS. 7 and 8 illustrate a sixth preferred embodiment of the present invention. This embodiment is similar to the motor built-in magnetic bearing device according to the fourth embodiment described in connection with the fourth embodiment shown in FIG. 5, but differs therefrom in that the motor 28 is so constructed as to assist the function of the electromagnet 17.

As shown in a circuit block diagram in FIG. 8, in the magnetic bearing controller 19, in a manner similar to that described hereinbefore in connection with the first embodiment, detection outputs P1 and P2 from the sensors 18 are added or subtracted each other by a sensor output calculating circuit 30; a result of calculation so obtained is compared by a comparator 31 with a reference value, fed from a reference value setting unit 32, to calculate a deviation; and a deviation so calculated is finally subjected to proportion plus integration (or proportion) that is suitably set by an PI compensating circuit (or a P compensating circuit) 33 according to the turbine unit 5, whereby control signals to be applied to the electromagnets 17 can be calculated. Based on a control signal calculated by the PI compensating circuit (or the P compensating circuit, the electromagnets $17_1$ and $17_2$ are driven through the diodes 34 and 35. On the other hand, in the motor controller 29, in a phase adjusting circuit 38 for the motor drive current, based on the control signal, calculated by the PI compensating circuit (or the P compensating circuit) 33, and a rotation synchronizing command, the phase adjustment is carried out so as to assist the magnetic bearing function by means of the electromagnets 17 and the motor drive current so adjusted in phase is supplied from a motor drive circuit 39 to the motor stators 28b, resulting in a constant rotation of the motor 28. Other structural features than those described above are similar to those shown and described in connection with the fourth embodiment.

Figure 9:
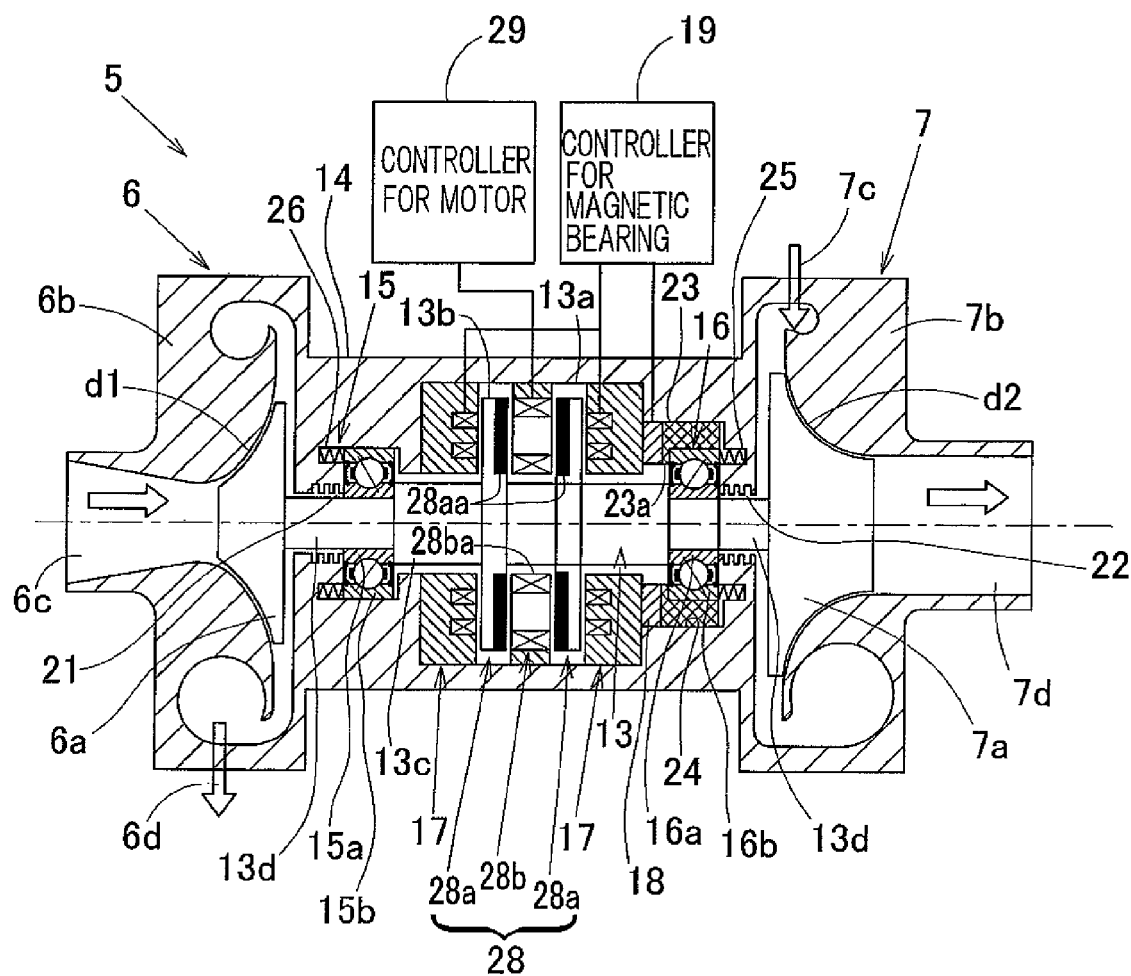
FIG. 9 is a longitudinal sectional view of the turbine unit incorporating therein the motor built-in magnetic bearing device according to a seventh preferred embodiment of the present invention.

A seventh preferred embodiment of the present invention will now be described with particular reference to FIG. 9. FIG. 9 illustrates a longitudinal sectional view of the turbine unit 5 incorporating therein the motor built-in magnetic bearing device according to this embodiment. In this embodiment, component parts shown in and described in connection with this embodiment, which are similar to those shown in and described in connection with the first embodiment, are designated by like reference numerals employed in connection with the first embodiment and, therefore, the details thereof are not reiterated for the sake of brevity.

The electromagnets 17 are arranged in a pair in the spindle housing 14 so as to confront, on a non-contact basis, rear surfaces or surfaces facing opposite directions of two flange shaped thrust plates 13a and 13b, which are mounted coaxially on the main shaft at an axially intermediate portion thereof so as to extend radially outwardly and as to be juxtaposed axially relative to each other and which are made of a ferromagnetic material. More specifically, one of the electromagnets 17 forming a part of the magnetic bearing unit is arranged within the spindle housing 14, with an electromagnet target thereof represented by one of the rear surfaces, which is oriented towards the expansion turbine 7 and provided on the thrust plate 13a positioned on a side close to the expansion turbine 7, so as to confront such one of the rear surfaces. Also, the other of the electromagnets 17 forming another part of the magnetic bearing unit is arranged within the spindle housing 14, with an electromagnet target thereof represented by one of the rear surfaces, which is oriented towards the compressor 6 and provided on the thrust plate 13b positioned on a side close to the compressor 6, so as to confront such other one of the rear surfaces.

The motor 28 is a motor unit including motor rotors 28a, mounted on the main shaft 13 in juxtaposed relation with the electromagnets 17, and a motor stator 28b axially opposed relative to these motor rotors 28a. More specifically, the motor rotors 28a forming a part of the motor unit are constructed by arranging permanent magnets 28aa respectively on front surfaces or opposed surfaces of the respective thrust plates 13a and 13b, which confront in a direction counter to the associated electromagnets 17, that is, which are opposed to each other, so as to be equidistantly spaced from each other in a direction circumferentially thereof. In this way, between the permanent magnets 28aa arranged in axially opposed relation to each other, the magnetic poles thereof are so set as to be opposite to each other. Since the low carbon steel excellent in magnetic characteristic is employed for the main shaft 13, each of the thrust plates 13a and 13b so provided as to form an integral construction with the main shaft 13 can be used to concurrently serve as a back yoke of the permanent magnets 28aa and the electromagnet target.

The motor stator 28b forming the other part of the motor unit is so constructed that at an axially intermediate position sandwiched between the left and right motor rotors 28a, a coil 28ba, arranged in a coreless state so as to confront, on an non-contact basis, the respective surfaces of the motor rotors 28a, can be arranged in the spindle housing 14. This motor 28 is operable to drive the main shaft 13 by means of a Lorentz force developed between the motor rotors 28a and the motor stators 28b. Thus, since the motor 28 of the axial gap type is employed in the form of a coreless motor, the negative stiffness brought about by the magnetic coupling between the motor rotors 28a and the motor stator 28b is zero.

In other words, in this motor built-in magnetic bearing device, since the motor 28 of the axial gap type is employed in the form of a coreless motor, it is possible to render the negative stiffness, which acts on the motor 28, to be zero and, even in a condition in which a high load acts on the motor 28, the relation in magnitude as expressed by the formula (2) discussed hereinbefore in connection with the first embodiment can be maintained.

As a result, in the control region, it is possible to avoid the phase of the mechanical system from being retarded 180° and, accordingly, even when the maximum load acts, the target to be controlled by the controller 19 can be stabilized and controller 19 can have a simplified circuit configuration utilizing a proportion or proportion plus integration as shown in FIG. 2 in connection with the first embodiment.

Also, in this embodiment, when the magnetic bearing unit is formed by arranging the two electromagnets 17 at respective locations axially outwardly of the two thrust plates 13a and 13b mounted on the main shaft 13 in axially juxtaposed relation to each other and, also, the motor unit is formed by arranging the motor 28 of the axial gap type at a location sandwiched between the thrust plates 13a and 13b, the magnetic bearing unit and the motor unit can be formed as a compact unitary construction. Accordingly, the shaft length of the main shaft 13 can be decreased, accompanied by an increase of the natural frequency of the main shaft enough to permit the main shaft 13 to be driven at a high speed.

Figure 10:
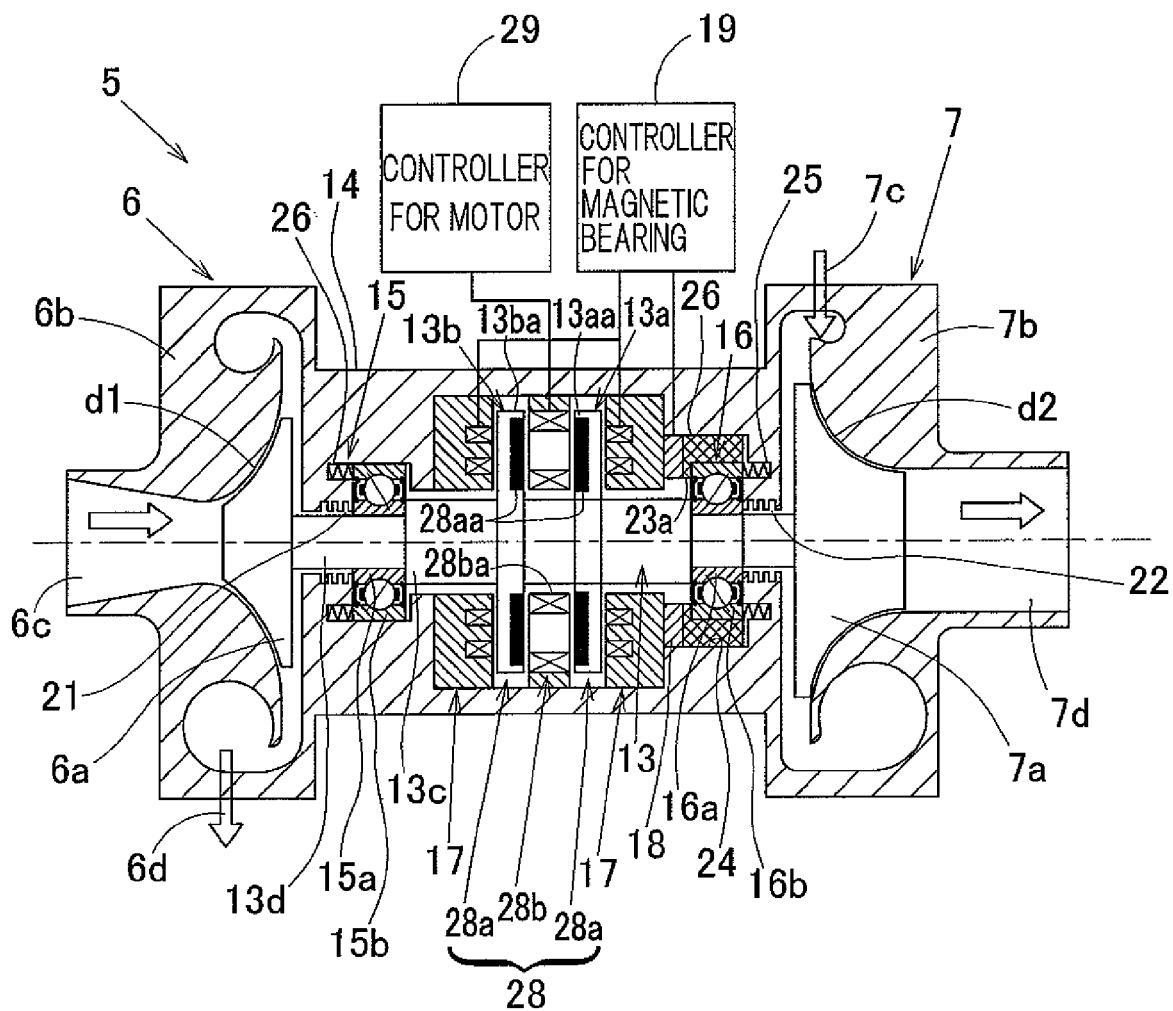
FIG. 10 is a longitudinal sectional view of the turbine unit incorporating therein the motor built-in magnetic bearing device according to an eighth preferred embodiment of the present invention.

An eighth preferred embodiment will be described subsequently with particular reference to FIG. 10. FIG. 10 illustrates a longitudinal sectional view of the turbine unit 5 incorporating therein the motor built-in magnetic bearing device according to this embodiment. In this embodiment, component parts shown in and described in connection with this embodiment, which are similar to those shown in and described in connection with the first and seventh embodiments, are designated by like reference numerals employed in connection with the first and seventh embodiments and, therefore, the details thereof are not reiterated for the sake of brevity.

While the motor stator 28b of the motor 28 is of a structure identical with that employed in the seventh embodiment, the motor rotors 28a are different from those employed in the seventh embodiment in the following respect. The permanent magnets 28aa of the motor rotors 28a are fixed to the respective surfaces of the thrust plates 13a and 13b by the use of a bonding agent. Between the permanent magnets 28aa so arranged as to be opposed axially relative to each other, the magnetic poles thereof are rendered to be different. Also, an outer diametric portion of each of the respective surfaces of the thrust plates 13a and 13b, to which the permanent magnets 28aa are bonded, is formed with a collar 13aa and 13ba of a height equal to or greater than the thickness of the permanent magnets 28aa. In other words, the permanent magnets 28aa are bonded to each of the respective surfaces of the thrust plates 13a and 13b in an embedded fashion, without allowing the surfaces of the permanent magnets 28aa to protrude from tips of the collars 13aa and 13ba. Since the low carbon steel excellent in magnetic characteristic is used for the main shaft 13, the thrust plates 13a and 13b so provided as to be a structure integral with the main shaft 13 concurrently serves as a back yoke for the permanent magnets 28aa and the electromagnet target.

As hereinabove described, since in this motor built-in magnetic bearing device, a portion of the outer diametric portion of each of the thrust plates 13a and 13b, which is on one side adjacent the permanent magnets 29aa is formed with the respective collar 13aa and 13ba, the collars 13aa and 13ba in the thrust plate outer diametric portions are effective to avoid scattering of the permanent magnets 28aa from the thrust plates 13a and 13b under the influence of the centrifugal force developed during the rotation of the main shaft 13, even when the bonding strength of the bonding agent used to secure the permanent magnets 28aa for the motor rotors 28a to the thrust plates 13a and 13b is deteriorated thermally or with passage of time.

In addition, if the height of each of the collars 13aa and 13ba of the thrust plates 13a and 13b is lower than the thickness of the permanent magnets 28aa, there is the risk that when the permanent magnets 28aa are pressed against the collars 13aa and 13ba, the permanent magnets 28aa may be compressed and hence destructed as an edge load, developed in edges of the collars 13aa and 13ba, acts on side faces of the permanent magnets 28aa. However, since in the illustrated embodiment, the height of each of the collars 13aa and 13ab is chosen to be equal to or higher than the thickness of the permanent magnets 28aa, it is possible to avoid the possibility that the edge load developed in the edges of the collars 13aa and 13ba acts on the side faces of the permanent magnets 28aa and, therefore, a compression destruction of the permanent magnets 28aa can be avoided.

Figure 11:
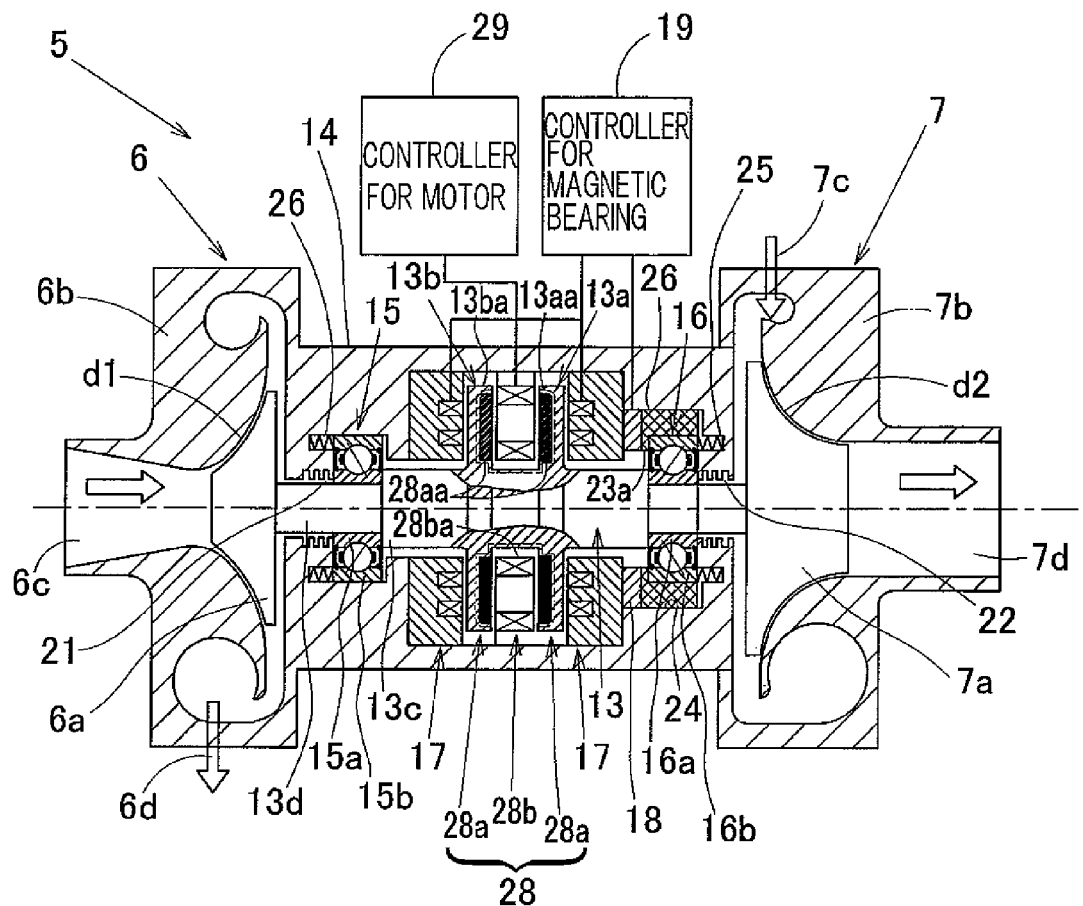
FIG. 11 is a longitudinal sectional view of the turbine unit incorporating therein the motor built-in magnetic bearing device according to a ninth preferred embodiment of the present invention.

Hereinafter, a ninth preferred embodiment of the present invention will be described with particular reference to FIGS. 11 and 12. FIG. 11 illustrates a longitudinal sectional view of the turbine unit 5 incorporating therein the motor built-in magnetic bearing device according to this embodiment. In this embodiment, component parts shown in and described in connection with this embodiment, which are similar to those shown in and described in connection with the first, seventh and eighth embodiments, are designated by like reference numerals employed in connection with the first, seventh and eighth embodiments and, therefore, the details thereof are not reiterated for the sake of brevity.

Even in this embodiment, as a material for the main shaft, a low carbon steel (a carburized steel (SCM 415, SCM 420), S15CK and others) is employed and the two thrust plates 13a and 13b are formed integrally with the main shaft 13.

In this embodiment, an outer diametric portion of each of the respective surfaces of the thrust plates 13a and 13b, to which the permanent magnets 28aa are bonded, is formed with a collar 13aa and 13ba of a height equal to or greater than the thickness of the permanent magnets 28aa for avoiding scattering of the permanent magnets. In other words, the permanent magnets 28aa are bonded to each of the respective surfaces of the thrust plates 13a and 13b in an embedded fashion, without allowing the surfaces of the permanent magnets 28aa to protrude from tips of the collars 13aa and 13ba.

As described above, since the outer diametric portion of each of the thrust plates 13a and 13b is formed with the respective collar 13aa and 13ba, the collars 13aa and 13ba in the thrust plate outer diametric portions are effective to avoid scattering of the permanent magnets 28aa from the thrust plates 13a and 13b under the influence of the centrifugal force developed during the rotation of the main shaft 13, even when the bonding strength of the bonding agent used to secure the permanent magnets 28aa for the motor rotors 28a to the thrust plates 13a and 13b is deteriorated thermally or with passage of time.

It is to be noted that since as hereinabove described, the low carbon steel excellent in magnetic characteristic is used for the main shaft 13, the thrust plates 13a and 13b so provided as to be a structure integral with the main shaft 13 concurrently serves as a back yoke for the permanent magnets 28aa and the electromagnet target.

Figure 12:
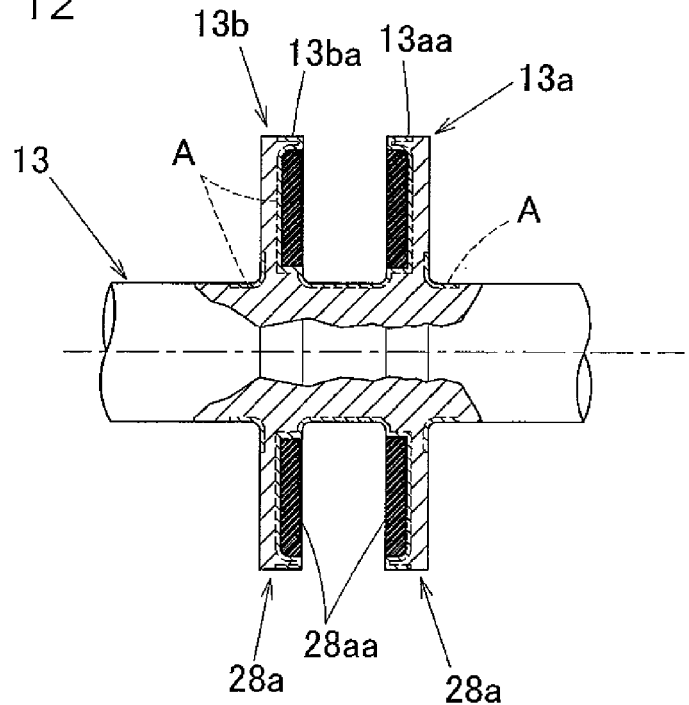
FIG. 12 is a fragmentary enlarged diagram, with a portion broken away, of a thrust plate employed in the motor built-in magnetic bearing device according to the ninth preferred embodiment of the present invention.

As shown in FIG. 12 on an enlarged scale, respective root portions of the two thrust plates 13a and 13b are subjected to corner rounding or chamfering so as to have R1 or more. The surfaces of the thrust plates 13a and 13b, where the permanent magnets 28aa are arranged, the root portions of the thrust plates 13a and 13b, the collars 13aa and 13ba and root portions of those collars 13aa and 13ba are subjected to a carburizing and quenching treatment A so that they can withstand against an excessive stress which may be developed during a high speed rotation.

In the motor built-in magnetic bearing according to this embodiment, since the surfaces of the thrust plates 13a and 13b, where the permanent magnets 28aa are arranged, the root portions of the thrust plates 13a and 13b, the collars 13aa and 13ab formed in the outer diametric portions of the thrust plates 13a and 13b and the root portions of those collars are subjected to the carbonizing and quenching A (FIG. 12), they can withstand against the excessive stress, which may be centered on those portions during the high speed rotation, and, therefore, a centrifugal destruction can be avoided, allowing the thrust plates 13a and 13b, which form the electromagnet targets, to have a required excellent magnetic characteristic and a required high strength concurrently. Accordingly, there is no need to increase the thickness of each of the thrust plates 13a and 13b while they have an excellent magnetic characteristic, and, therefore, the main shaft 13 can have a reduced shaft length, accompanied by an increase of the natural frequency of the main shaft 13 and the main shaft 13 can be driven at a high speed.

Figure 13:
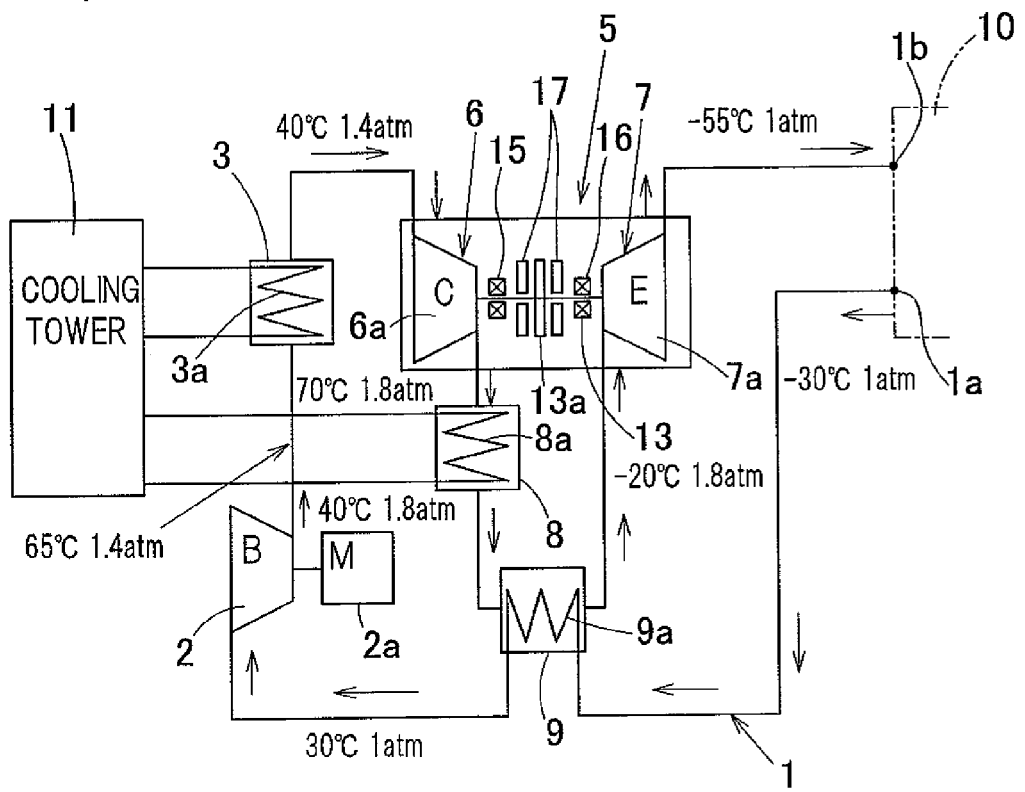
FIG. 13 is a system diagram showing an air cycle refrigerating system to which the turbine unit incorporating therein the motor built-in bearing device according to any one of the second to sixth embodiments of the present invention is applied.
Figure 14:
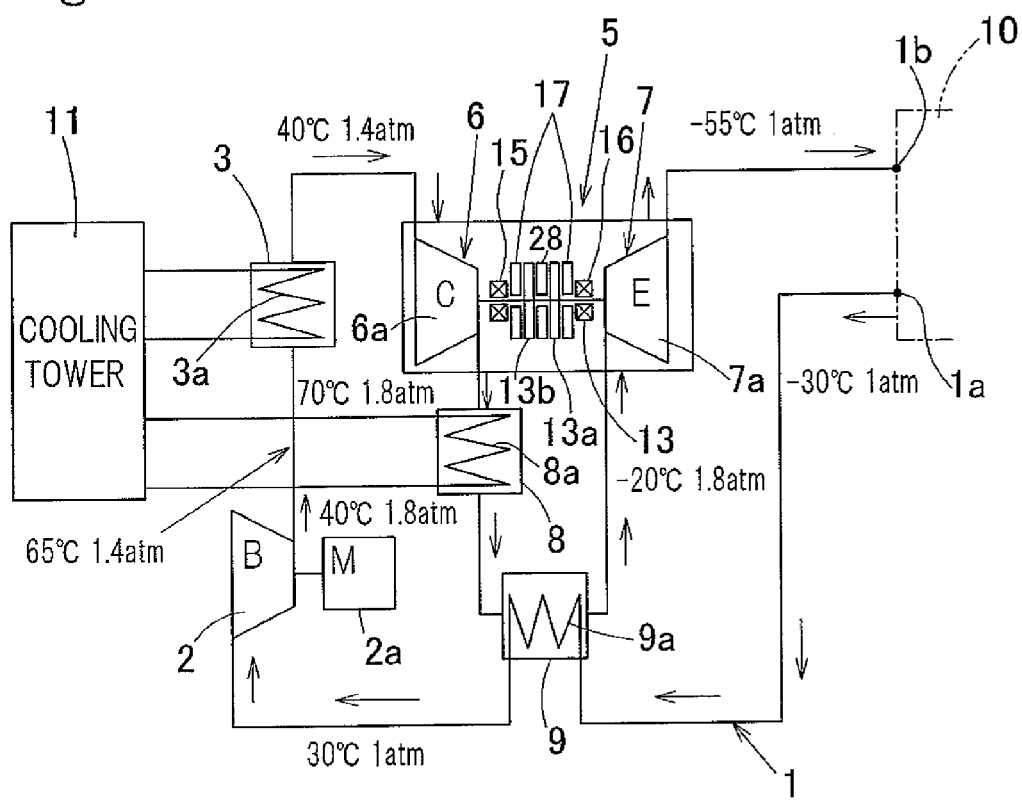
FIG. 14 is a system diagram showing an air cycle refrigerating system to which the turbine unit incorporating therein the motor built-in bearing device according to any one of the seventh to ninth embodiments of the present invention is applied.
Figure 15:
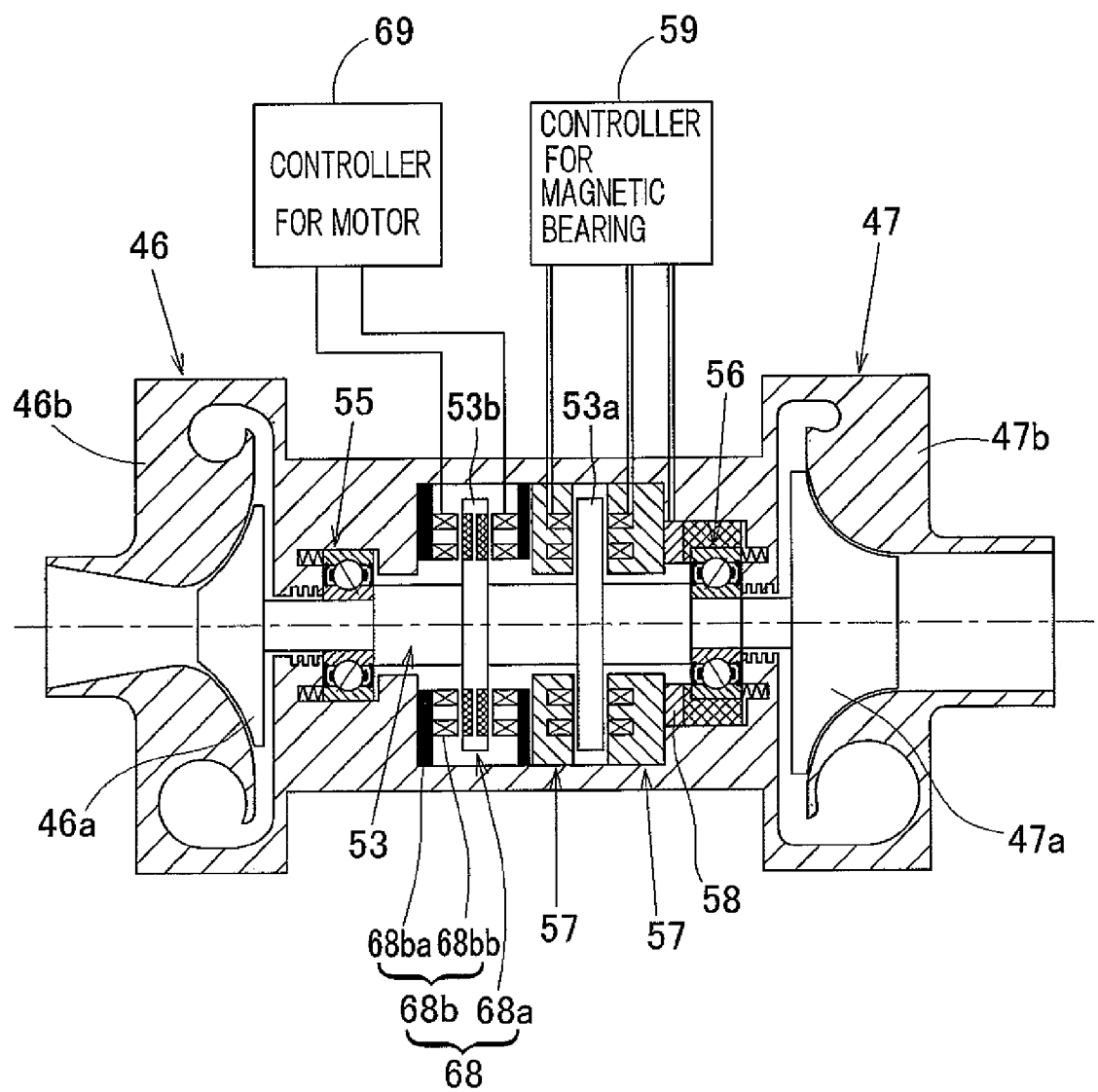
FIG. 15 is a longitudinal sectional view of the turbine unit incorporating therein the conventional motor built-in magnetic bearing device.

FIGS. 13 and 14 illustrates the air cycle refrigerating system in its entirety, which makes use of the turbine unit 5 of the structure described hereinbefore. Specifically, FIG. 13 illustrates the system construction, in which the turbine unit 5 referred to above incorporates therein the motor built-in magnetic bearing device according to any one of the first to sixth embodiments whereas FIG. 14 illustrates the system construction, in which the turbine unit 5 referred to above incorporates therein the motor built-in magnetic bearing device according to the seventh to ninth embodiment. This air cycle refrigerating system is a cooling system, in which an air within a space 10 to be cooled such as, for example, a cold storage warehouse, is used directly as a coolant, and includes an air circulating circuit 1 extending from an air intake port 1a, open in the to-be-cooled space 10, back to a discharge port 1b also open in the to-be-cooled space 10. This air circulating circuit 1 includes a pre-compressing unit 2, a first heat exchanger 3, the compressor 6 of the air cycle refrigerating turbine unit 5, a second heat exchanger 8, an intermediate heat exchanger 9 and the expansion turbine 7 of the turbine unit 5. The intermediate heat exchanger 9 is operable to perform, within the same air circulating circuit 1, a heat exchange between the incoming air in the vicinity of an air intake port 1a and the air, which has been boosted in temperature at the subsequent stage and is then cooled, and the air in the vicinity of the air intake port 1a flows through the heat exchanger 9a.

The pre-compressing unit 2 is in the form of, for example, a blower and is driven by a motor 2a. The first heat exchanger 3 and the second heat exchanger 8 include respective heat exchangers 3a and 8a for circulating the coolant and perform a heat exchange between water within the heart exchangers 3a and 8a and the air within the air circulating circuit 1. Each of the heat exchangers 3a and 8a is connected to cooling tower 11 through pipes or fluid connected with a cooling tower 11 and the coolant of a temperature boosted as a result of the heat exchange can be cooled within this cooling tower 11. It is to be noted that the air cycle refrigerating system may be the one in which the pre-compressing unit 2 is not utilized.

This air cycle refrigerating system referred to above is a system for maintaining the to-be-cooled space 10 at a temperature of about 0 to −60° C. and the air of about 0 to −60° C. and of 1 normal atmosphere (1 atm) flows from the to-be-cooled space 10 to the air intake port 1a of the air circulating circuit 1. It is to be noted that specific numerals representative of the temperature and the pressure that are used in the subsequent description are only for purpose of illustrating rough operation conditions. The air entering into the air intake port 1a is used by the intermediate heat exchanger 9 to cool the air in the subsequent stage of the air circulating circuit 1 and is heated to 30° C. This heated air remains at 1 normal atmosphere, but is compressed by the pre-compressing unit 2 to 1.4 normal atmosphere and, as a result of this compression, is heated up to 70° C. The first heat exchanger 3 is of a type capable of only cooling the air heated to 70° C. and is, accordingly, effective to efficiently cool the air with cold water of which the temperature is approximately room temperature and cools the air to 40° C.

The air of 40° C. and 1 normal atmosphere so cooled as a result of the heat exchange is subsequently compressed by the compressor 6 of the turbine unit 5 to 1.8 normal atmosphere and the air heated to about 70° C. as a result of this compression is cooled by the second heat exchanger 8 down to 40° C. The air of 40° C. is then cooled by the intermediate heat exchanger 9 down to −20° C. as a result of the heat exchange with the intaking air of −30° C. The pressure is maintained at 1.8 normal atmosphere as discharged from the compressor 6.

The air cooled by the intermediate heat exchanger 9 down to −20° C. is adiabatically expanded by the expansion turbine 7 of the turbine unit 5 and is, after having been cooled further down to −55° C., discharged from the discharge port 1b to the to-be-cooled space 10. This air cycle refrigerating system performs such a refrigerating cycle as described above.

With this air cycle refrigerating system, since in the turbine unit 5, a stabilized high speed revolution of the main shaft 13 can be obtained while the proper clearances d1 and d2 of the rotors 6a and 7a are maintained, and the long term durability and the lifetime of each of the bearing units 15 and 16 can be increased, the reliability of the turbine unit 5 as a whole and, hence, that of the air cycle refrigerating system as a whole can be increased. Since as hereinabove described, the stabilized high speed revolution, the long term durability and the reliability of the main shaft bearing units 15 and 16 of the turbine unit 5, which has hitherto been posed a major bottleneck to the air cycle refrigerating system, can be increased, the air cycle refrigerating system has now come to be employed practically.

Hereinafter, some constructions, which will form a preferred embodiment of the present invention and which utilize the magnetic bearing device according to any one of the previously described first to ninth constructions as a fundamental, will be summarized below:

[Tenth Construction]

The motor built-in magnetic bearing device according to the fourth construction, in which the motor rotor formed in the thrust plate in common to the electromagnet is arranged on an outer diametric side of the electromagnet. In the case of this tenth construction, a larger torque can be obtained with a minimized motor drive current.

[Eleventh Construction]

The motor built-in magnetic bearing device according to the fourth construction, in which the back yoke of the electromagnet and the back yoke of the motor stator are common to each other. In the case of this eleventh construction, since the electromagnet and the motor stator can be formed as a unitary structure, handling thereof during the assemblage can be facilitated.

[Twelfth Construction]

The motor built-in magnetic bearing device according to the fourth construction, in which a controller is provided for adjusting the phase of a axial gap type motor drive current so as to assist the electromagnet in dependence on the outputs from the sensors.

[Thirteenth Construction]

The motor built-in magnetic bearing device according to the fifth construction, in which the two thrust plates are formed integrally with the main shaft. In the case of this thirteenth construction, those thrust plates can be concurrently used as the back yoke of the permanent magnets and the electromagnet target.

[Fourteenth Construction]

The motor built-in magnetic bearing device according to the sixth construction, in which the height of the collar formed in the thrust plate is equal or larger than the thickness of the permanent magnet.

[Fifteenth Construction]

The motor built-in magnetic bearing device according to the seventh construction, in which the height of the collar formed in the thrust plate is equal or larger than the thickness of the permanent magnet.

According to the fourteenth and fifteenth constructions, if the height of the collar of the thrust plate is smaller than the thickness of the permanent magnet, there is the risk that when the permanent magnet is pressed against the collar, the permanent magnet may be compressed and hence destructed as an edge load, developed in edges of the collar, acts on a side face of the permanent magnet. However, selection of the height of the collar of the thrust plate, which is equal to or larger than the thickness of the permanent magnet, is effective to avoid the possibility that the edge load developed in the edges of the collar acts on the side face of the permanent magnet and, therefore, a compression destruction of the permanent magnet can be avoided.

What is claimed is:

1. A motor built-in magnetic bearing device which comprises:
    a main shaft;
    a flange shaped thrust plate coaxially mounted on the main shaft so as to extend perpendicular to the main shaft and made of a ferromagnetic material;
    a rolling bearing unit for supporting a radial load;
    a magnetic bearing unit for supporting one or both of an axial load and a bearing preload and having an electromagnet fitted to a spindle housing so as to confront the thrust plate, on a non-contact basis;
    a motor for driving the main shaft and having a motor rotor mounted on the main shaft and a motor stator arranged in face-to-face relation with the motor rotor, the main shaft being driven by a magnetic force or a Lorentz force developed between the motor rotor and the motor stator;
    a sensor for detecting an axial force acting on the rolling bearing unit; and
    a controller for controlling the electromagnet in response to an output from the sensor;
    wherein a stiffness of a composite spring formed by the rolling bearing unit and a support system for the rolling bearing unit is higher than a negative stiffness of a composite spring of a motor part comprised of the motor and the electromagnet.

2. The motor built-in magnetic bearing device as claimed in claim 1, wherein the motor rotor is mounted on the main shaft along with the thrust plate.

3. The motor built-in magnetic bearing device as claimed in claim 2, wherein the motor is a coreless motor.

4. The motor built-in magnetic bearing device as claimed in claim 1, wherein the motor is a motor of an axial gap type and is arranged on one or both of opposite surfaces of the thrust plate together with an electromagnet target.

5. The motor built-in magnetic bearing device as claimed in claim 1, wherein the motor is a coreless motor of an axial gap type for driving the main shaft by means of a Lorentz force developed between the motor rotor and the motor stator; and
    the thrust plate is provided in two in number, the two thrust plates being spaced a distance from each other in the axial direction;

an electromagnet target is formed in each of respective surfaces of those thrust place that are opposed away from each other;

permanent magnets for the motor rotor are arranged in other respective surfaces of the thrust plates that confront with each other and are equidistantly spaced from each other in a circumferential direction;

the magnetic poles of the permanent magnets on one of the thrust plates are opposed to the magnetic poles of the permanent magnets on the other of the thrust plates; and the motor stator is arranged so as to be sandwiched between the permanent magnets on the opposed surfaces and fitted to the spindle housing.

6. The motor built-in magnetic bearing device as claimed in claim 5, wherein a collar is formed in an outer diametric portion of each of the confronting surfaces of the thrust plate.

7. The motor built-in magnetic bearing device as claimed in claim 6, wherein the confronting surfaces of the thrust plates and formed with the permanent magnets, root portions of the thrust plates and collars formed in outer diametric portions of the thrust plates and root portions of those collars are subjected to a carburizing treatment.

8. The motor built-in magnetic bearing device as claimed in claim 1, which is applied to a compression expansion turbine system, in which a compressor rotor and a turbine rotor are mounted on the main shaft together with the thrust plate and the compressor rotor is driven by one or both of respective powers generated by the motor and the turbine rotor.

9. The motor built-in magnetic bearing device as claimed in claim 8, wherein the compression expansion turbine system, to which the motor built-in magnetic bearing device is applied, is applied to an air cycle refrigerating system in which an incoming air is subjected sequentially to compression by means of a compressor including the compressor rotor in the turbine unit, cooling by means of a different heat exchanger, and adiabatic expansion by means of an expansion turbine including the turbine rotor in the turbine unit, or compression by means of a pre-compressing unit, cooling by means of a heat exchanger, compression by means of the compressor, cooling by means of the different heat exchanger, and adiabatic expansion by means of the expansion turbine.

* * * * *